(12) United States Patent
Stegeman et al.

(10) Patent No.: US 11,149,926 B2
(45) Date of Patent: Oct. 19, 2021

(54) LUMINAIRE CONTROL DEVICE WITH UNIVERSAL POWER SUPPLY

(71) Applicant: Labyrinth Technologies, LLC, Hazelwood, MO (US)

(72) Inventors: John T. Stegeman, Hazelwood, MO (US); Theodore J. Stegeman, Hazelwood, MO (US)

(73) Assignee: Labyrinth Technologies, LLC, Hazelwood, MO (US)

( * ) Notice: Subject to any disclaimer, the term of this patent is extended or adjusted under 35 U.S.C. 154(b) by 0 days.

(21) Appl. No.: 16/696,661

(22) Filed: Nov. 26, 2019

(65) Prior Publication Data

US 2020/0096180 A1 Mar. 26, 2020

Related U.S. Application Data

(63) Continuation of application No. 16/694,529, filed on Nov. 25, 2019, which is a continuation-in-part of (Continued)

(51) Int. Cl.
*F21V 21/00* (2006.01)
*F21V 21/116* (2006.01)
(Continued)

(52) U.S. Cl.
CPC ............ *F21V 21/116* (2013.01); *F21S 8/086* (2013.01); *F21V 23/008* (2013.01); *F21V 31/00* (2013.01);
(Continued)

(58) Field of Classification Search
CPC ... H04L 12/282; H04L 67/125; H05B 47/105; H05B 47/19; H05B 45/00; H05B 45/10;
(Continued)

(56) References Cited

U.S. PATENT DOCUMENTS

| | | |
|---|---|---|
| 4,731,551 A | 3/1988 | Gibbs et al. |
| 5,235,252 A | 8/1993 | Blake |

(Continued)

FOREIGN PATENT DOCUMENTS

| | | |
|---|---|---|
| CA | 2609455 A1 | 11/2006 |
| CN | 101113806 A1 | 1/2008 |

(Continued)

OTHER PUBLICATIONS

Marcelo Schupbach, "Next-Gen LED Lighting Designs Driven by SiC Devices", 2015, www.wolfspeed.com.*

(Continued)

*Primary Examiner* — Thien T Mai
(74) *Attorney, Agent, or Firm* — Lewis Rice LLC

(57) ABSTRACT

A luminaire control device for use with a municipal light pole. The device is plugged into a standard dimming receptacle and includes a universal power supply for converting AC power received in any of the common municipal distribution voltages to a uniform DC output usable by small electronic components of an accompanying control system. The universal power supply and control system are configured to fit within the form factor required by applicable standards. The control system includes program logic to control the luminaire by sending control signals via the dimming receptacle. These signals may be sent using one, two, or more control channels as defined by the standard, and may control a single luminaire or multiple luminaires via the different channels. The device may further include a wireless transceiver to facilitate remote access and control of the light, allowing a municipal light pole to be retrofitted as an IoT device.

3 Claims, 13 Drawing Sheets

Related U.S. Application Data application No. 16/409,213, filed on May 10, 2019, now Pat. No. 10,495,291, which is a continuation of application No. 16/384,898, filed on Apr. 15, 2019, which is a continuation of application No. 15/656,675, filed on Jul. 21, 2017, now Pat. No. 10,260,719, said application No. 16/694,529 is a continuation-in-part of application No. 16/448,941, filed on Jun. 21, 2019, now Pat. No. 10,697,620, and a continuation-in-part of application No. 29/680,947, filed on Feb. 21, 2019, now Pat. No. Des. 928,987.

(60) Provisional application No. 62/792,213, filed on Jan. 14, 2019, provisional application No. 62/806,300, filed on Feb. 15, 2019, provisional application No. 62/368,574, filed on Jul. 29, 2016, provisional application No. 62/688,194, filed on Jun. 21, 2018.

(51) Int. Cl.

| | |
|---|---|
| *F21V 31/00* | (2006.01) |
| *F21V 23/00* | (2015.01) |
| *F21S 8/08* | (2006.01) |
| *H05B 47/105* | (2020.01) |
| *H05B 47/19* | (2020.01) |
| *H05B 47/11* | (2020.01) |
| *H05B 47/115* | (2020.01) |
| *F21Y 115/10* | (2016.01) |
| *F21W 131/103* | (2006.01) |

(52) U.S. Cl.
CPC ........... *H05B 47/105* (2020.01); *H05B 47/11* (2020.01); *H05B 47/115* (2020.01); *H05B 47/19* (2020.01); *F21W 2131/103* (2013.01); *F21Y 2115/10* (2016.08)

(58) Field of Classification Search
CPC ........ H05B 41/36; H05B 47/16; H05B 47/10; H05B 47/115; H05B 47/195; H05B 35/00; H05B 39/08; H05B 45/31; H05B 47/175; H05B 45/3725; H05B 39/088; H05B 41/3922; H05B 47/11; H05B 41/2828; H05B 45/305; H05B 39/048; H05B 41/3925; H05B 45/20; H05B 47/185; H05B 45/38; H05B 45/385; H05B 39/04; H05B 39/041; H05B 39/09; H05B 41/046; H05B 41/28; H05B 41/392; H05B 41/3921; H05B 41/3927; H05B 45/12; H05B 45/22; H05B 45/345; H05B 45/3575; H05B 45/37; H05B 45/395; H05B 45/56; H05B 47/13; H05B 47/24; H05B 45/382; H04W 4/00; F21S 8/086; F21S 8/085; F21V 21/30; F21V 23/0464; F21V 21/116; F21V 21/008; F21V 23/045; F21V 15/01; F21V 23/06; F21V 23/0435; F21V 31/00; F21V 23/04; F21V 23/001; F21V 23/0442; F21W 2131/103; F21W 2131/10; F21Y 2103/10; F21Y 2115/10; F21Y 2113/00; F21Y 2105/10

See application file for complete search history.

(56) References Cited

U.S. PATENT DOCUMENTS

| | | |
|---|---|---|
| 5,651,612 A | 7/1997 | Braun |
| 5,895,986 A | 4/1999 | Walters et al. |
| 6,452,339 B1 | 9/2002 | Morrissey et al. |
| 6,462,775 B1 | 10/2002 | Loyd et al. |
| 6,811,444 B2 | 11/2004 | Geyer |
| 7,406,298 B2 | 7/2008 | Luglio et al. |
| 7,706,757 B2 | 4/2010 | Luglio et al. |
| 7,723,862 B1 | 5/2010 | Spillman et al. |
| 7,828,463 B1 | 11/2010 | Willis |
| 8,120,280 B2 | 2/2012 | Yi et al. |
| 8,140,276 B2 | 3/2012 | Walters et al. |
| 8,382,387 B1 | 2/2013 | Sandoval |
| 8,442,785 B2 | 5/2013 | Walters et al. |
| 8,502,408 B2 | 8/2013 | Schneider et al. |
| 8,558,413 B1 | 10/2013 | Lepard |
| 8,588,942 B2 | 11/2013 | Agrawal |
| 8,693,965 B2 | 4/2014 | McKay et al. |
| 8,866,582 B2 | 10/2014 | Verfuerth et al. |
| 9,148,934 B2 | 9/2015 | Matsuki |
| 9,175,954 B2 | 11/2015 | Koerner et al. |
| 9,198,264 B2 | 11/2015 | Challapali et al. |
| 9,226,368 B2 | 12/2015 | Agrawal |
| 9,301,365 B2 | 3/2016 | Reed |
| 9,326,359 B2 | 4/2016 | Bosua |
| 9,338,862 B2 | 5/2016 | Noesner et al. |
| 9,387,928 B1 | 7/2016 | Gentry et al. |
| 9,526,142 B2 | 12/2016 | Schroder et al. |
| 9,593,843 B2 | 3/2017 | McRory |
| 9,651,420 B2 | 5/2017 | Weber |
| 9,795,003 B2 | 10/2017 | Johnson |
| 9,907,147 B2 | 2/2018 | Chen et al. |
| 10,094,546 B2 | 10/2018 | Agrawal et al. |
| 10,154,571 B2 | 12/2018 | Lai et al. |
| 10,205,345 B2 | 2/2019 | Tuerk et al. |
| 10,219,360 B2 | 2/2019 | Vendetti et al. |
| 10,238,001 B2 | 3/2019 | Agrawal et al. |
| 10,374,282 B2 | 8/2019 | Johnson et al. |
| 10,378,735 B1 | 8/2019 | Patel |
| 10,390,414 B2 | 8/2019 | Vendetti et al. |
| 10,403,959 B2 | 9/2019 | Johnson et al. |
| 10,568,191 B2 | 2/2020 | Vendetti et al. |
| 2003/0152423 A1 | 8/2003 | Wu |
| 2004/0100793 A1 | 5/2004 | Monitto |
| 2004/0105264 A1 | 6/2004 | Spero |
| 2005/0168169 A1 | 8/2005 | Kurachi et al. |
| 2006/0044789 A1 | 3/2006 | Curtis |
| 2007/0013513 A1 | 1/2007 | Tang et al. |
| 2007/0171640 A1 | 7/2007 | Sloan et al. |
| 2008/0106892 A1 | 5/2008 | Griffiths et al. |
| 2008/0175216 A1 | 7/2008 | Nasco |
| 2009/0206670 A1 | 8/2009 | Whitted et al. |
| 2010/0061095 A1 | 3/2010 | Hoffmann |
| 2011/0058358 A1 | 3/2011 | Soo et al. |
| 2011/0171080 A1 | 7/2011 | Lo |
| 2012/0020060 A1 | 1/2012 | Myer et al. |
| 2012/0051050 A1 | 3/2012 | Lee et al. |
| 2012/0063125 A1 | 3/2012 | Quaal et al. |
| 2012/0143383 A1 | 6/2012 | Cooperrider et al. |
| 2012/0327639 A1 | 12/2012 | Chen |
| 2013/0040471 A1 | 2/2013 | Gervais et al. |
| 2013/0064136 A1 | 3/2013 | Apostolakis |
| 2013/0077327 A1 | 3/2013 | Butler et al. |
| 2013/0107520 A1 | 5/2013 | O'Kane |
| 2013/0142372 A1 | 6/2013 | Harwood |
| 2013/0193876 A1 | 8/2013 | Cleland et al. |
| 2014/0016356 A1 | 1/2014 | Furmanczyk et al. |
| 2014/0028200 A1 | 1/2014 | Van Wagoner et al. |
| 2014/0052390 A1 | 2/2014 | Kim et al. |
| 2014/0071677 A1* | 3/2014 | Pickard ............... H05B 45/3725 362/249.02 |
| 2014/0211487 A1 | 7/2014 | Spiro |
| 2014/0312776 A1 | 10/2014 | Park et al. |
| 2015/0016159 A1 | 1/2015 | Deboy |
| 2015/0062890 A1 | 3/2015 | Camarota |
| 2015/0115807 A1* | 4/2015 | Schroder ................. H05B 45/18 315/158 |
| 2015/0264776 A1 | 9/2015 | Amarin et al. |
| 2015/0362172 A1* | 12/2015 | Gabriel .................. F21S 8/088 348/151 |
| 2015/0369618 A1 | 12/2015 | Barnard et al. |
| 2016/0095182 A1 | 3/2016 | Bjorn et al. |
| 2016/0286629 A1 | 9/2016 | Chen et al. |

(56) References Cited

U.S. PATENT DOCUMENTS

| | | | |
|---|---|---|---|
| 2016/0318568 | A1 | 11/2016 | Hosoda et al. |
| 2016/0320049 | A1 | 11/2016 | Bears |
| 2017/0146223 | A1* | 5/2017 | Chaoua ................ H05B 47/175 |
| 2017/0310232 | A1 | 10/2017 | De Hoog et al. |
| 2018/0031213 | A1 | 2/2018 | Stegeman et al. |
| 2018/0045388 | A1 | 2/2018 | McDowell et al. |
| 2018/0116040 | A1 | 4/2018 | Mann et al. |
| 2018/0279429 | A1 | 9/2018 | Sadwick |
| 2018/0288860 | A1* | 10/2018 | Vendetti ................ H05B 47/19 |
| 2018/0295703 | A1 | 10/2018 | Xue et al. |
| 2019/0017667 | A1 | 1/2019 | Mitchell et al. |
| 2019/0174608 | A1* | 6/2019 | Verfuerth ............... H05B 41/36 |
| 2019/0279429 | A1 | 9/2019 | Chen et al. |
| 2019/0305551 | A1 | 10/2019 | Ley et al. |
| 2019/0305554 | A1 | 10/2019 | Sharifipour et al. |
| 2019/0305688 | A1 | 10/2019 | Seymour |
| 2019/0360667 | A1 | 11/2019 | Patel |
| 2019/0380191 | A1* | 12/2019 | Wu ....................... H05B 47/115 |
| 2020/0020480 | A1 | 1/2020 | Coquinco |
| 2020/0045794 | A1 | 2/2020 | Reed et al. |

FOREIGN PATENT DOCUMENTS

| | | |
|---|---|---|
| CN | 104520636 A | 4/2015 |
| DE | 7723862 U1 | 12/1978 |
| DE | 8812785 U1 | 10/1988 |
| EP | 3018977 A1 | 5/2016 |
| EP | 3290788 A1 | 3/2018 |
| FR | 2399019 A1 | 2/1979 |
| GB | 2444734 A | 6/2008 |
| KR | 101585531 B1 | 1/2016 |
| WO | 2014066298 A1 | 5/2014 |
| WO | 20140184166 A2 | 11/2014 |
| WO | 2016053034 A1 | 4/2016 |
| WO | 2016075116 A2 | 5/2016 |
| WO | 2017139089 A1 | 8/2017 |

OTHER PUBLICATIONS

Brunhuber, Kim, "In San Diego, a lamppost can tell you where to park," CBC News website, Technology & Science, https://www.cbc.ca/news/technology/san-diego-smart-city-parking-1.4498964, dated Feb. 7, 2018, printed on Sep. 18, 2019 (5 pages).

Bigelow, Bruce V., "GE Plans a Sale as San Diego Smart City Project Nears Completion," Xconomy website, San Diego, https://xconomy.com/san-diego/2018/06/14/ge-plans-a-sale-as-san-diegosmart-city-project-nears-completion/, dated Jun. 14, 2018, printed on Sep. 18, 2019 (2 pages).

Maddox, Teena, "New smart city traffic project takes off in Portland, OR," TechRepublic website, dated Jun. 20, 2018, printed on Sep. 18, 2019 (4 pages).

Goldstein, Phil, "Portland Turns to Smart Sensors to Enhance Traffic Safety," StateTech Magazine website, https://www.techrepublic.com/article/new-smart-city-traffic-project-takes-offin-portland-or/, dated Jul. 30, 2018, printed on Sep. 18, 2019 (3 pages).

Chakrabarty, Gargi, "Portland Deploys Sensors to Make Street Safer," Icons of Infrastructure website, https://iconsofinfrastructure.com/portland-uses-sensors-to-make-streetssafer/, printed on Sep. 18, 2019 (2 pages).

"SmartCities," Clean Tech San Diego website, http://cleantechsandiego.org/smart-cities-home/, printed on Sep. 18, 2019 (7 pages).

"GE smart lighting technology expected to save City of San Diego more than $250K annually," LEDs Magazine, https://www.ledsmagazine.com/company-newsfeed/article/16684696/ge-smart-lighting-expected-to-save-city-of-san-diego-more-than-250k-annually, dated Jan. 29, 2014, printed on Jan. 24, 2020 (16 pages).

Wright, Maury, "Oceanside installs GPS-enabled LED street lights from GE Lighting," LEDs Magazine, https://www.ledsmagazine.com/architectural-lighting/outdoor-lighting/article/16696766/oceanside-installs-gpsenabled-led-street-lights-from-ge-lighting, dated Jul. 20, 2015, printed on Jan. 24, 2020 (22 pages).

"GE Lighting talks controls and networks at Lightfair International 2013," LEDs Magazine, https://www.ledsmagazine.com/leds-ssl-design/networks-controls/article/16697295/ge-lighting-talks-controls-and-networks-at-lightfair-international-2013, dated Apr. 24, 2013, printed on Jan. 24, 2020 (19 pages).

"LightGrid Outdoor Wireless Control System," https://products.gecurrent.com/control-systems/lightgrid-outdoor-wireless-control-system, printed on Jan. 24, 2020 (17 pages).

"LightGrid Outdoor Wireless Control System," https://facilityexecutive.com/2018/lightgrid-outdoor-wireless-control-system/, dated Mar. 30, 2018, printed on Jan. 24, 2020 (5 pages).

Perry, Tekla S., "San Diego's Smart Streetlights Yield a Firehose of Data," Spectrum IEEE website, https://pectrum.ieee.org/view-from-the-valley/computing/networks/sandiegos-smart-streetlight-network-yielding-a-firehose-of-data, dated Jan. 16, 2019, printed on Sep. 18, 2019 (4 pages).

Labyrinth Technologies—4G & 5G Poles https://labyrinth-tech.com/solutions/small-cell-facilites.html Apr. 2019 (Year: 2019).

International Search Report and Written Opinion for related application No. PCT/US2020/013523, dated Jul. 6, 2020, 16 pages.

* cited by examiner

LUMINAIRE CONTROL DEVICE WITH UNIVERSAL POWER SUPPLY

CROSS-REFERENCE TO RELATED APPLICATIONS

This application is a continuation of U.S. patent application Ser. No. 16/694,529, filed Nov. 25, 2019, which claims the benefit of U.S. Prov. Pat. App. No. 62/792,213, filed Jan. 14, 2019, and which claims the benefit of U.S. Prov. Pat. App. No. 62/806,300, filed Feb. 15, 2019, and which is a continuation-in-part of U.S. patent application Ser. No. 16/409,213, filed May 10, 2019, which is a continuation of U.S. patent application Ser. No. 16/384,898, filed Apr. 15, 2019, which is a continuation of U.S. patent application Ser. No. 15/656,675, filed Jul. 21, 2017, and issued as U.S. Pat. No. 10,260,719 on Apr. 16, 2019, which claims the benefit of U.S. Prov. Pat. App. No. 62/368,574, filed Jul. 29, 2016. Said U.S. patent application Ser. No. 16/694,529 is also a continuation-in-part of U.S. patent application Ser. No. 16/448,941, filed Jun. 21, 2019, which claims the benefit of U.S. Prov. App. No. 62/688,194, filed Jun. 21, 2018, and U.S. Prov. Pat. App. No. 62/792,213, filed Jan. 14, 2019. U.S. patent application Ser. No. 16/694,529 is also a continuation-in-part of U.S. patent application Ser. No. 29/680,947, filed Feb. 21, 2019. The entire disclosures of all of these cases is incorporated herein by reference.

BACKGROUND OF THE INVENTION

Field of the Invention

This disclosure is related to the field of municipal lighting, and more particularly, to a luminaire control device including a power supply housed within a standardized form factor.

Description of the Related Art

The "smart" movement is an attempt to utilize interconnected devices as a way to generate data and supply improved and more targeted services. The basic concept is that when "things" can communicate with each other and with users, a wealth of data can be made available, often in real time, which can then be accumulated and analyzed without the need for users to manually gather, store, and organize this information.

One area where this concept is now being implemented is in the "smart city" movement, in which municipalities leverage various types of automated data collection to provide information that can be used to manage municipal assets and resources in an efficient and effective manner. These efforts rely on a variety of data sources, ranging from data collected automatically by devices in various locations throughout the city, to devices carried by citizens or employees. Data may also be collected by or from vehicles, or provided directly by citizens. "Smart city" strategies can help improve the delivery and efficiency of city services, such as law enforcement, trash collection, public safety, traffic management, and even achieve reductions in pollution and crime.

Commonly, "Internet of Things," or IoT, devices are leveraged in a smart city to obtain real-time data about municipal operations. The idea is that a more accurate and up-to-date data snapshot of the city can be used to improve the quality of municipal services and optimize costs and resource utilization. These solutions are particularly attractive in densely populated areas, where the cost overhead of deploying IoT devices and collecting and monitoring data provides high information density relative to cost.

However, there are a number of challenges with smart city initiatives (or in smart systems more generally). One such challenge is determining where and how to deploy devices, as well as managing and consolidating the vast quantity of data produced for effective analysis and use. For example, all of the devices are electrically powered, which requires a source of electricity. This in turn means that devices are generally installed on municipal fixtures with an existing source of power, such as a light pole.

An example of one such prior art fixture is depicted in FIG. 1. The depicted municipal fixture (103) is in the nature of a municipal light. The depicted fixture (103) comprises a base (104) affixed to a sidewalk (106) adjacent to a street (108), with an elongated pole (105) extending vertically from the base (104). The pole (105) provides sufficient elevation to disperse illumination, allow clearance for passing pedestrians and vehicles, and inhibit tampering. Extending laterally from the pole (105) is a light arm (107). A light head (109) is attached to the light arm (107). The light head (109) contains a source of illumination (110). A power conduit runs through the pole (105) and the light arm (107) to the source of illumination (110), and an electric power line (111) is run through that conduit from a municipal power source (not depicted) to power the source of illumination (110). Typically, the source of illumination is a municipal luminaire (110).

However, municipal lights have various power supply configurations, sometimes even within the same cluster of lights. This in turn requires a multitude of different, expensive power adapters to be deployed. If the lights are later rewired or the power characteristics change, all of the power supplies must be replaced. Further, each individual device on or within the fixture (103) may have different power requirements, which in turn can require a single fixture (103) to be equipped with multiple power conversion units for each device.

Another problem is that even once the devices are installed and powered, to get real-time data, the devices must communicate live data as it is collected. This in turn requires network access, which is difficult and expensive to deploy and manage. Most cities are very old, and it is uneconomical to run power and network wires to every device deployed in the city. Further, the quantity of data produced by any one device is typically modest, and providing a wired data solution is expensive and wasteful.

Using wireless solutions is also problematic. Although the quantity of data is often manageable through a standard short-range wireless transmission protocol, this is not always the case. Short-range wireless transmission devices have a limited transmission radius, generally measured in hundreds of feet, and up to two thousand feet at the high end. A balance must be struck between broadcast distance and bandwidth, wherein long-range transmissions have very low bitrates, and high-bitrate transmissions have very short range. This can introduce network slowdowns and dropped packets in standard wireless protocols, particularly if a particular device receives a temporary burst of activity, such as from an unexpectedly large amount of data generated at a particular device or a flood of data from other nearby devices.

In any case, even a transmission radius of two thousand feet is too small to allow all devices in a city to communicate directly with a central server so that data can be gathered, collected, analyzed, and used in real time. Each IoT device can be equipped with a broadband wireless transmitter, such as a cellular data transmitter, but this imposes significant costs and is wasteful by providing more bandwidth that is reasonably expected to be produced by any one individual device during ordinary use.

Another problem subsists in how to attach the devices and the required accompanying hardware to the fixture (103), and to communicate with new devices. For example, a typical municipal lighting pole (105) lacks sufficient suitable surfaces for attaching IoT devices, power converters, and wireless transmitters. Moreover, some of this equipment should be stored within an enclosure to minimize damage from weather and tampering. In particular, power converters must tap into the central power line (111) of the pole (105), meaning they must have access to the internal structure of the fixture (103), but a fixture (103) typically has insufficient interior volume to install the power supply. Further, each device has its own command system and communication protocol, requiring a separate communication gateway for each device.

This presents additional challenges as cities upgrade older lights to newer, more energy-efficient technologies, such as LED-based light sources. Moreover, in the continued effort of reducing power utilization related to street lights, attempts have been made to reduce power usage during off-peak times, or whenever full power is not necessary. However, such solutions have been incomplete.

Control over the luminaire (110) in a standard street light can be implemented via a dimming receptacle (115) atop the light head (109). The receptacles (115) are mechanical and electrical/physical interfaces to the luminaire (110) for control devices. For example, the ANSI C136.41 standards define multiple interface configurations facilitating various degrees of control over the luminaire (110). These include 3-, 5-, and 7-pin interface configurations.

In the simplest interface, a 3-pin configuration, the three pins provide power lines only. In the 5-pin configuration, three pins provide power and the remaining two pins provide a dimming circuit, referred to in the art as "DIM". In the 7-pin configuration, three pins provide power, two pins provide a first dimming circuit (known in the art as "DIM1"), and the final two pins provide a second dimming circuit (known in the art as "DIM2"). One problem with the ANSI C136.41 standards, particularly in 7-pin configurations, is that the dimming circuit lines are sometimes accidentally swapped. Additionally, prior art implementations have used pulse-width modulation dimming, which produces flicker when using the dimming circuits. This has led to generally unsatisfactory implementations of the standard.

Another problem with the standard is that the physical dimensions limit the available form factor designs, which must be compact. This in turn limits how many components may be placed in a standard-compliant control device. This presents challenges in powering the components stored within the control device, because electronic components use low-voltage direct current (DC), but the three power pins pass through the current on the municipal line, meaning they carry alternating current (AC) at variable distribution voltages ranging from 110-480 volts AC. Thus, the components must be powered by an electrochemical cell, which produces DC power, a point-of-consumption energy sources such as a photovoltaic device or small wind turbine, or the AC power received via the municipal line must be converted to DC, and stepped down to a usable voltage.

Batteries and point-of-consumption solutions introduce additional difficulties. Batteries eventually expire and must be replaced, which requires servicing. Additionally, by the nature of its location, the control device is exposed to hostile environmental conditions, which can reduce battery life. Likewise, renewable solutions cannot reliably provide power in most deployment locations, requiring battery back-ups. Furthermore, such solutions add additional maintenance overhead. Accordingly, these solutions are expensive and duplicative, compared to the minimal power requirements of the internal components.

Likewise, using municipal power is difficult. For most of the last century, power has been supplied to cities using high voltage AC power lines, generally in the range of 138-765 kVAC, and then stepped down for industrial, commercial, and residential use, and converted to DC as necessary. This variability in voltage is provided across municipal power grids, and even within a power grid or street, is a result of various factors, such as consumer need and zoning. In any given area, distribution voltages can range between 110-480 VAC, with variances of +/−10%, resulting in a range of 90-528 VAC.

The practical consequence of these variances is that a multitude of control devices must be manufactured and stocked, one for each potential voltage. This imposes significant costs, such as stocking inventory, and tracking the voltage on any particular pole. For example, if a unit requires service or replacement, it can only be replaced by a unit adapted to convert the correct input voltage. If the service personnel are unsure of the voltage of a given pole, or accidentally use the wrong type of control device, the device may be damaged or simply not function at all.

The end result is that prior art solutions have been simplistic, and simply use a photocell to detect light and, if there is sufficient ambient illumination, cut power to the luminaire using the power supply pins in the standard. The dimming control circuits defined in the standard are not used because there is no way to power the components needed to use the dimming circuit lines via the receptacle interface.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Described herein, among other things, is a luminaire control device comprising: a base having a top side and an opposing bottom side, the bottom side having a plurality of power supply electrical connections disposed thereon and a plurality of control electrical connections disposed thereon; an enclosure sized and shaped to attach to the base to form a housing having an interior volume defined by the enclosure; a power supply disposed within the enclosure and in electrical communication with the first plurality of power supply electrical connections, the power supply comprising a plurality of electrical components selected and arranged to receive from the plurality of power supply electrical connections alternating current and convert the received alternating current to direct current; and a control system disposed within the enclosure and in electrical communication with plurality of control electrical connections, the control system comprising a non-transitory computer-readable storage medium and a processing system electrically powered by direct current from the power supply, the non-transitory computer-readable storage medium comprising instructions which, when executed by the processing system, transmit control signals via the plurality of control electrical connections.

In an embodiment of the luminaire control device, the luminaire control device further comprises: wherein the range of voltages is a range of municipal distribution voltages.

In an embodiment of the luminaire control device, the luminaire control device further comprises: wherein the range of municipal distribution voltages is between about 110 and 480 volts, inclusive.

In an embodiment of the luminaire control device, the luminaire control device further comprises: wherein the range of municipal distribution voltages is between about 110 and 480 volts, inclusive.

In an embodiment of the luminaire control device, the luminaire control device further comprises: wherein the range of municipal distribution voltages is between about 90 and 528 volts, inclusive.

In an embodiment of the luminaire control device, the luminaire control device further comprises: wherein the plurality of electrical components is further selected and arranged to convert the received alternating current to direct current of about 12 volts.

In an embodiment of the luminaire control device, the luminaire control device further comprises: wherein the control system further comprises a radio transceiver.

In an embodiment of the luminaire control device, the luminaire control device further comprises: wherein the radio transceiver communicates via a standard in the 802.11 family of wireless protocols.

In an embodiment of the luminaire control device, the luminaire control device further comprises: wherein the radio transceiver communicates via a standard in the 802.11 family of wireless protocols.

In an embodiment of the luminaire control device, the luminaire control device further comprises: wherein the control signals comprise dimming signals.

In an embodiment of the luminaire control device, the luminaire control device further comprises: wherein the control signals comprise color temperature signals.

In an embodiment of the luminaire control device, the luminaire control device further comprises: wherein the plurality of control signals comprise color temperature signals.

In an embodiment of the luminaire control device, the luminaire control device further comprises: wherein a first pair of control electrical connections in the plurality of control electrical connections defines a first control channel and a second pair of control electrical connections in the plurality of control electrical connections defines a second control channel.

Also described herein, among other things, is a municipal illumination system comprising: a municipal utility pole having a light aim disposed on a side thereof, the light arm having a municipal light head attached to a distal end thereof, the municipal light head comprising a dimming receptacle and a luminaire in electrical communication with the dimming receptacle, and the municipal utility pole comprising a municipal power line therein, the municipal power line in electrical communication with the dimming receptacle and the luminaire; and a luminaire control device installed in the dimming receptacle and comprising: a housing having an interior volume; a power supply disposed within interior volume and in electrical communication with the municipal power line via the dimming receptacle, the power supply receiving alternating current from the municipal power line at a first voltage and comprising electrical components selected and arranged to convert the received alternating current to direct current at a second voltage; and a control system disposed within the enclosure and in electrical communication with the luminaire via the dimming receptacle, the control system comprising a non-transitory computer-readable storage medium and a processing system electrically powered by direct current from the power supply, the non-transitory computer-readable storage medium comprising instructions which, when executed by the processing system, transmit control signals to the luminaire via the dimming receptacle.

In an embodiment of the municipal illumination system, the municipal illumination system further comprises: wherein the first voltage is in range of municipal distribution voltages.

In an embodiment of the municipal illumination system, the municipal illumination system further comprises: wherein the range is between about 90 and 528 volts, inclusive.

In an embodiment of the municipal illumination system, the municipal illumination system further comprises: wherein the second voltage is about 12 volts.

In an embodiment of the municipal illumination system, the municipal illumination system further comprises: wherein the control system instructions, when executed by the processing system, cause control signals to be transmitted to the luminaire via a first control channel and a second control channel.

In an embodiment of the municipal illumination system, the municipal illumination system further comprises: wherein the control system instructions, when executed by the processing system, cause control signals to be transmitted to the luminaire via a first control channel and a second control channel.

In an embodiment of the municipal illumination system, the municipal illumination system further comprises: wherein the control signals transmitted to the luminaire via the first control channel operate a first aspect of the luminaire and the control signals transmitted to the luminaire via the second control channel operating a second aspect of the luminaire.

In an embodiment of the municipal illumination system, the municipal illumination system further comprises: wherein the first aspect and the second aspect are each selected from one or more of the following: light intensity, color temperature, or power.

In an embodiment of the municipal illumination system, the municipal illumination system further comprises: a second luminaire disposed on the municipal utility pole, and wherein the control system instructions, when executed by the processing system, cause control signals to be transmitted to the luminaire via a first control channel and cause control signals to be transmitted to the second luminaire via a second control channel.

In an embodiment of the municipal illumination system, the municipal illumination system further comprises: a radio transceiver adapted to wirelessly receive instructions for control of the luminaire.

DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Throughout this disclosure, the term "municipal infrastructure fixture" refers to light, power, and telecommunications poles and appurtenances thereto, which are installed and used by or on behalf of cities and/or utilities and carriers, to deliver utilities and services to the public. Such poles are generally installed in series along a roadway for related purposes, such street lighting, power lines, and/or telecommunication cables. As further set forth in this disclosure, the fixtures are generally close enough together that a collection of short-range transmitters installed on them can form a mesh network. Other terms may also be used herein which have definitions set forth in related cases incorporated in the Cross-Reference section and elsewhere herein, including but not necessarily limited to U.S. patent application Ser. No. 16/694,529, filed Nov. 25, 2019.

Figure 1:
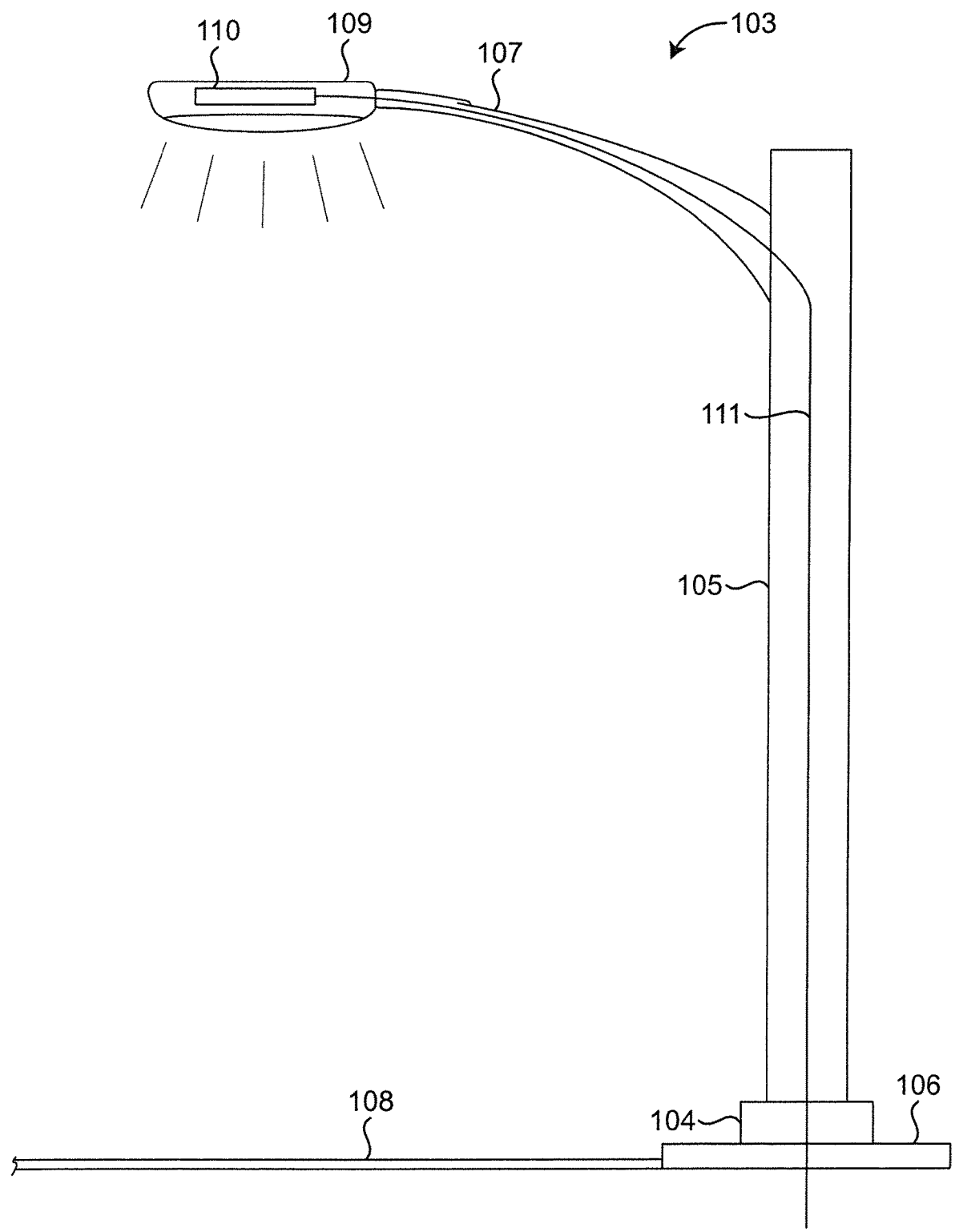
FIG. 1 depicts an embodiment of a prior art municipal fixture.
Figure 2:
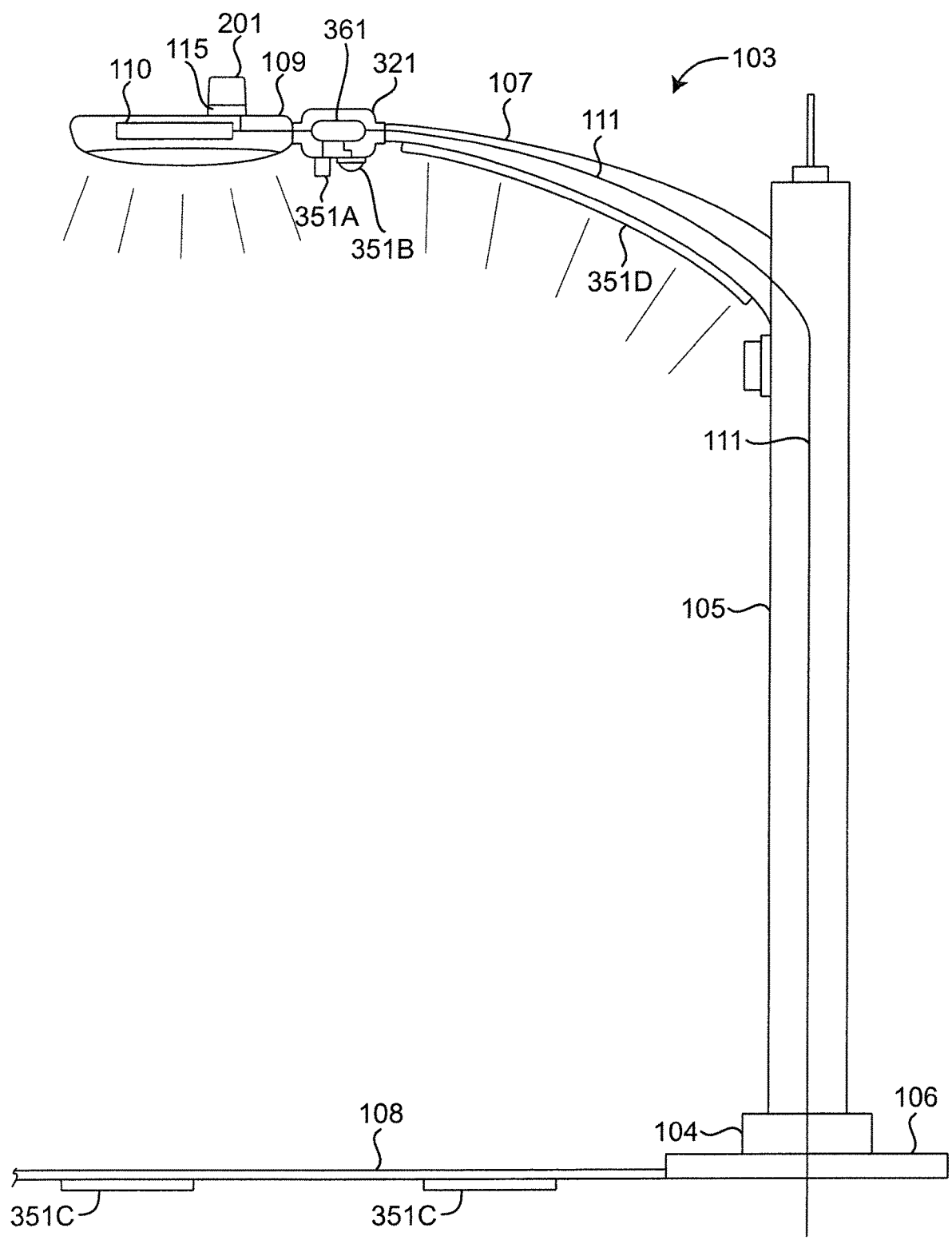
FIG. 2 depicts an embodiment of a municipal fixture modified with smart grid components as described herein.
Figure 3:
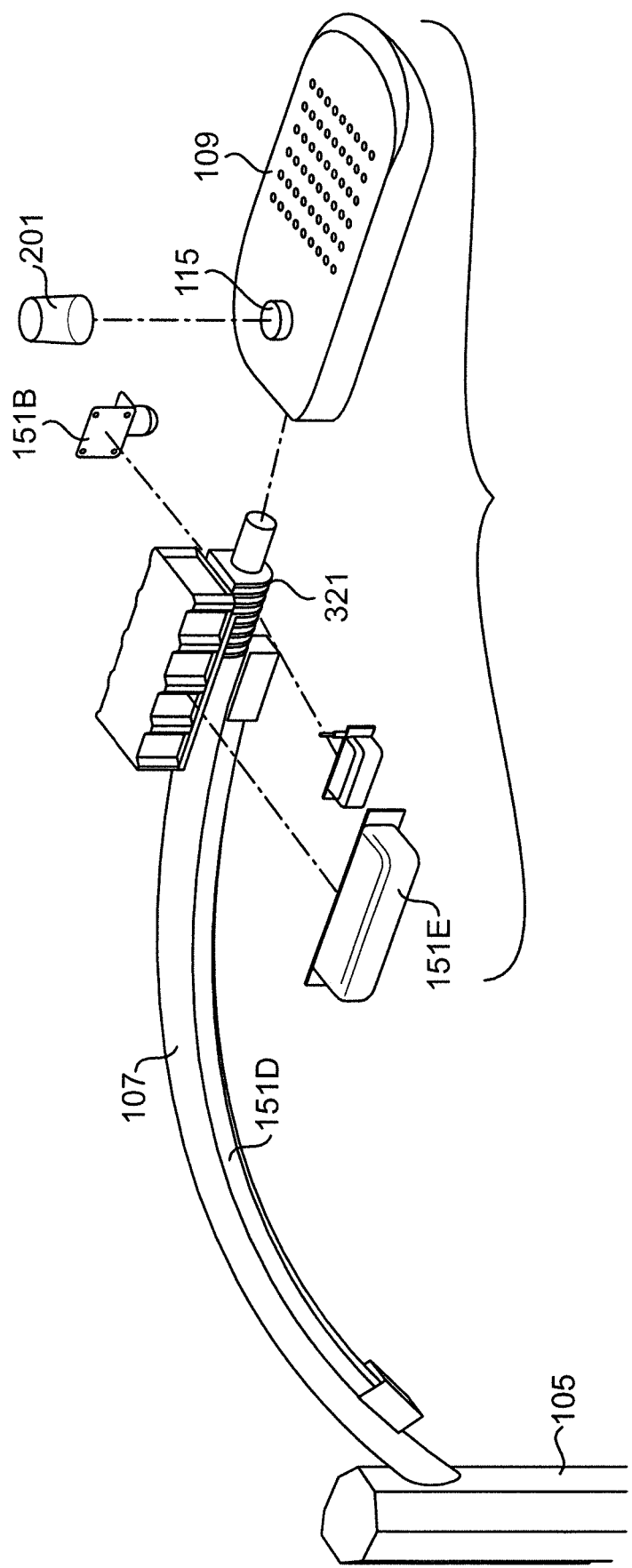
FIG. 3 depicts an alternative embodiment of a municipal fixture modified with smart grid components as described herein.
Figure 4:
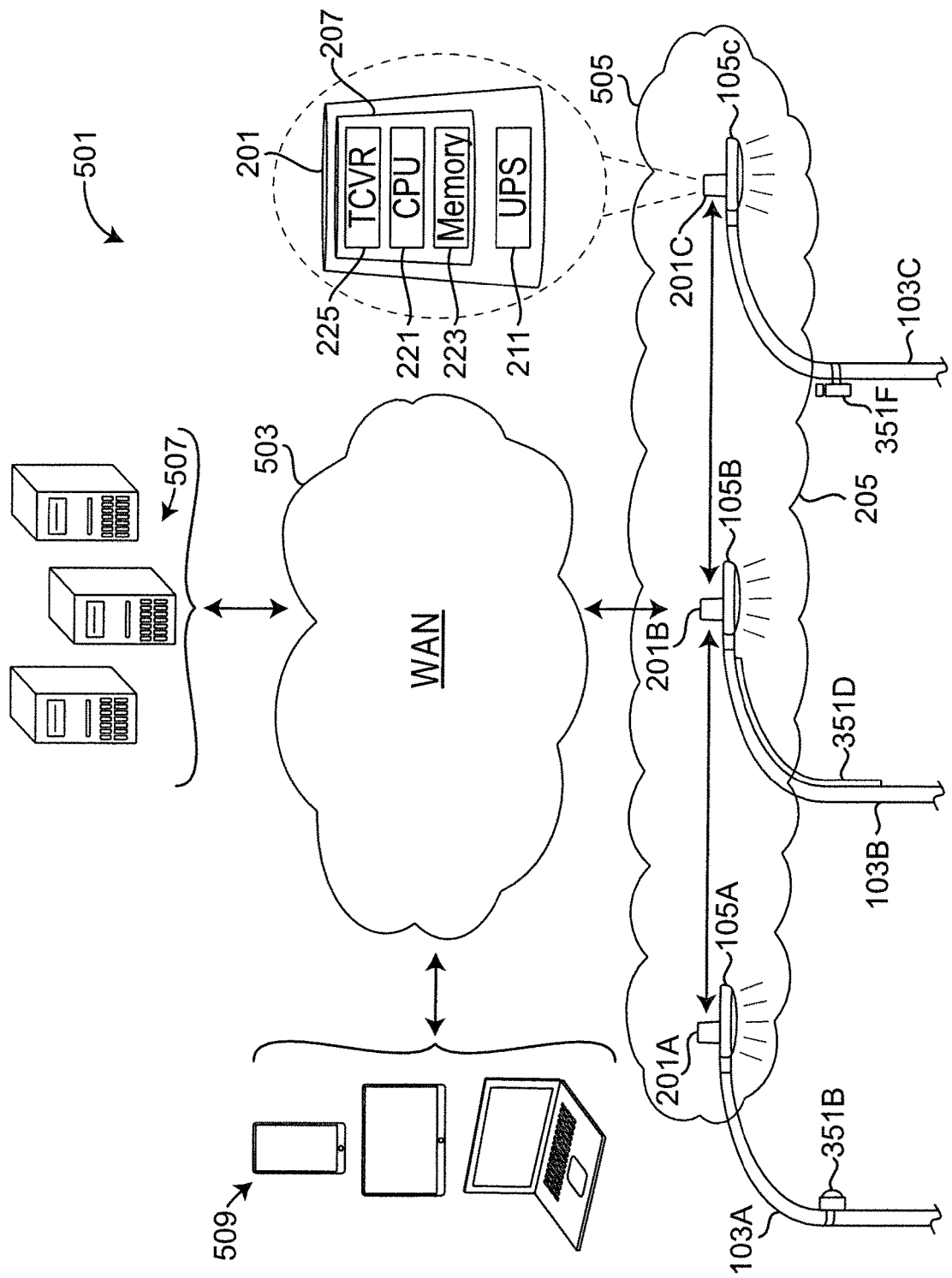
FIG. 4 depicts a system for aggregating signals in a mesh network as described herein.
Figure 5:
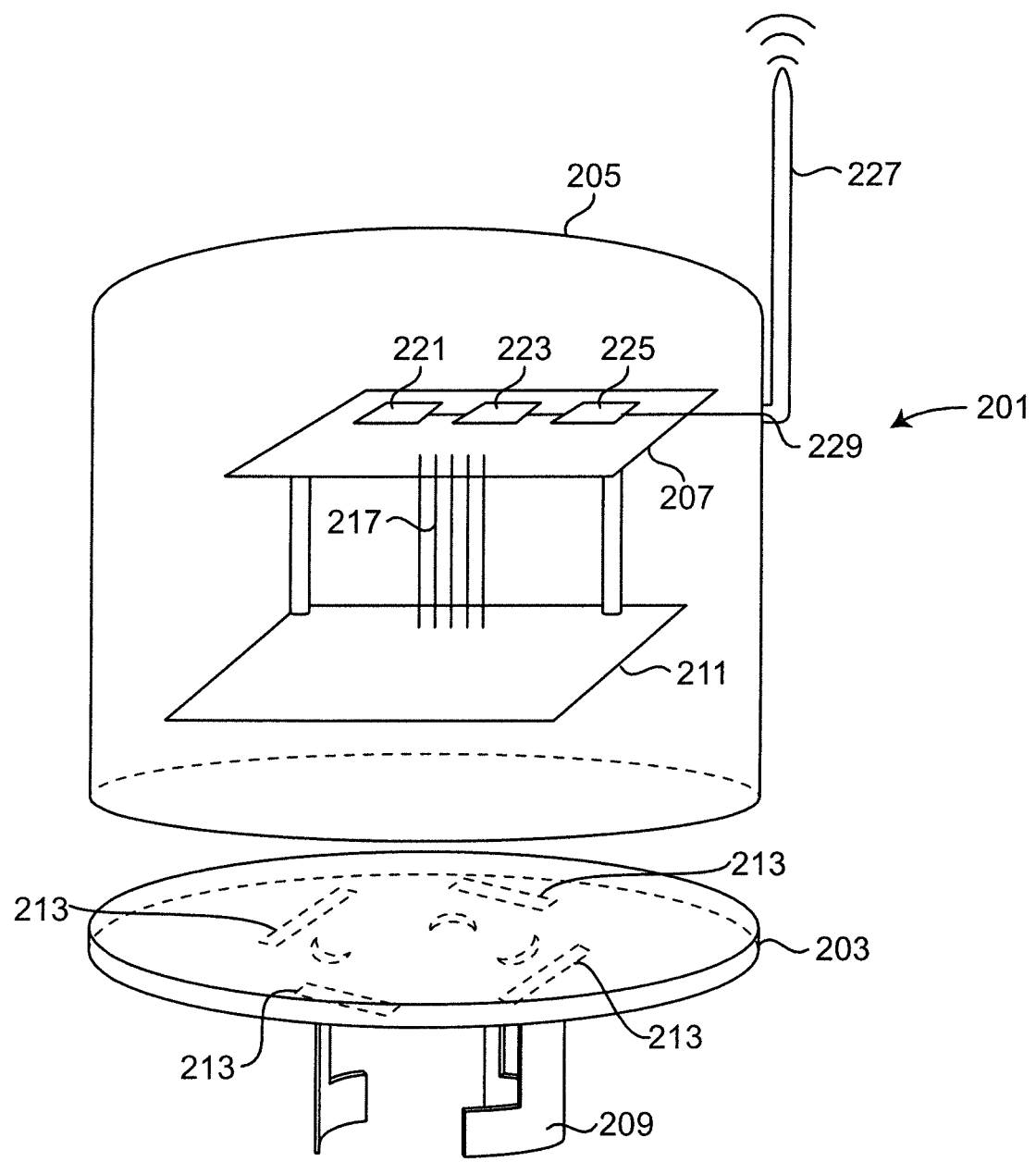
FIG. 5 provides an exploded diagram of an embodiment of a luminaire control device including a universal power supply as described herein.

Described herein, among other things, is a luminaire control device (201) including a universal power supply (211) and control system for use on a municipal infrastructure pole (103). FIG. 5 depicts a basic diagram of a device (201) as described herein. At a high level of generality, the luminaire control device (201) depicted in FIG. 5 can be thought of as having three main components: a housing (203) and (205), a power supply (211), and a control system (207). When the device (201) is further outfitted with a wireless communication system as part of a network of similar devices in a deployment, it may sometimes be referred to in shorthand as a "node" or "beacon."

The depicted housing comprises a base (203) and an enclosure (205) adapted to plug into a dimming receptacle (115) and enclose a power supply (211) and control system (207). The depicted control system (207) is adapted to control one or more luminaires (110), and the depicted power supply (211) is adapted to receive municipal electrical power in any of the commonly provided voltage ranges and convert that power into a uniform DC output suitable to power the components of the control system (207). Both of these elements (211) and (207) are adapted and arranged so as to fit within the enclosure (205), which is in turn adapted to the form factor of the base (203), and are further described elsewhere herein.

The form factor of the housing elements (203) and (205) may be defined or limited by the specifications of an applicable standard. For purposes of the exemplary embodiments described herein, that standard is ANSI C136.41. In an embodiment using the ANSI C136.41 standard, there may be 3-pin (power only), 5-pin (3 power pins plus one 2-pin dimming circuit), and 7-pin configurations (3 power pins and two 2-pin dimming circuits). In an alternative embodiment, the base (203) or other elements may comport with different standards or requirements as may be needed for the particular embodiment.

The depicted base (203) is a generally circular element made from a rugged, weather-resistant material to extend operational life and provide a suitable surface for supporting other elements. Generally, the base is sized and shaped to comport with the applicable standard for receptacles or sockets on a municipal light. As described elsewhere herein, the depicted base (203) is sized and shaped for use with a receptacle in compliance with ANSI C136.41.

The depicted enclosure (205) is a roughly cylindrical dome sized and shaped to accommodate the interior components of the device (201) described herein. The enclosure (205) has an open bottom end adapted to mate with the base (203) so as to form a sealed connection. The sealed connection should inhibit or prevent moisture penetration. Because the device (201) will ordinarily by used outdoors on a street light, it is desirable to endure outdoor weather conditions in most climates. The enclosure (205) should be manufactured from a rugged, water-resistant or waterproof material which can withstand liquid and solid precipitation, high winds, impacts from debris, and so forth. The enclosure (205) may be opaque, transparent, or translucent. A generally cylindrical enclosure (205) is shown but other sizes, shapes, and configurations of enclosures (205) are possible, including but not limited to enclosures (205) which have an orthogonal or prism configuration.

The particular configuration will generally depend on the shape of the base (203) to which the enclosure (205) attaches and the size and shape of the internal components. In certain embodiments, the enclosure (205) may further comprise one or more openings or apertures to allow some or all of the internal components to be disposed external to the enclosure (205). By way of example and not limitation, if an internal component is a wireless communication apparatus which includes an antenna (227), it may be desirable to dispose the antenna outside of the enclosure (205) for greater range. Thus, a water-resistant or watertight opening (229) in the enclosure (205) may be provided for this purpose.

In the depicted embodiment of FIG. 5, the base (203) has seven conductive elements to establish an electrical connection via the receptacle (115). These comprise three power transmission connections in the form of prongs (209) disposed in a circular twist-lock arrangement extending generally perpendicularly from the bottom of the base (203), and four functional inputs in the form of spring contacts (213). The depicted prongs (209) are sized, shaped, and arranged for plugging into the dimming receptacle (115) and provide a current path for electrical power (i.e., AC current) from the municipal power line (111) in the pole (105) to be provided to the power supply (211) as described elsewhere herein.

The particular size, shape, and number of prongs (209) may vary from embodiment to embodiment and will depend upon the particular configuration of the dimming receptacle (115) for which the device (201) is designed to interoperate. Generally, the prongs (209) comprise two hot lines and a neutral line and are electrically connected to the power supply (211).

The four depicted spring contacts (213) are for central circuits, or dimming pins, and are disposed in the positions on the bottom of the base (203) specified in the applicable standard. This allows the depicted device (201) to be used in a standard receptacle (115) to, for example, control light intensity, reduce power consumption, or perform other functions as described elsewhere herein. The contacts (213) are generally electrically connected to components of the control system (207). The depicted four dimming inputs (213) comprise various dimming command lines as defined by applicable standards. In an embodiment, the Digital Addressable Lighting Interface (DALI) standard may be used. These inputs generally do not connect directly to the power supply (211), but rather pass through to the control system (207) and are controlled by components disposed thereon.

Figure 10:
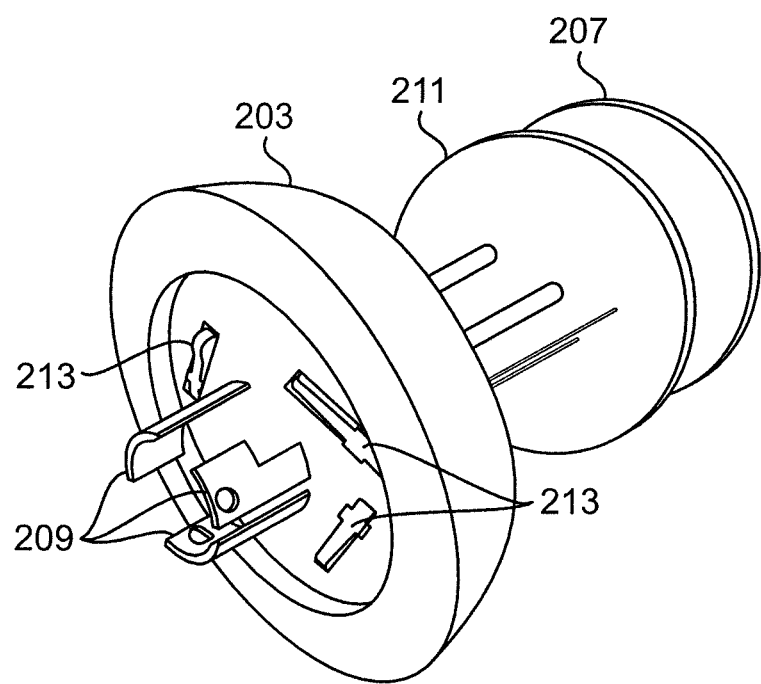
FIG. 10 provides an embodiment of a bottom side of a luminaire control device as described herein.
Figure 11:
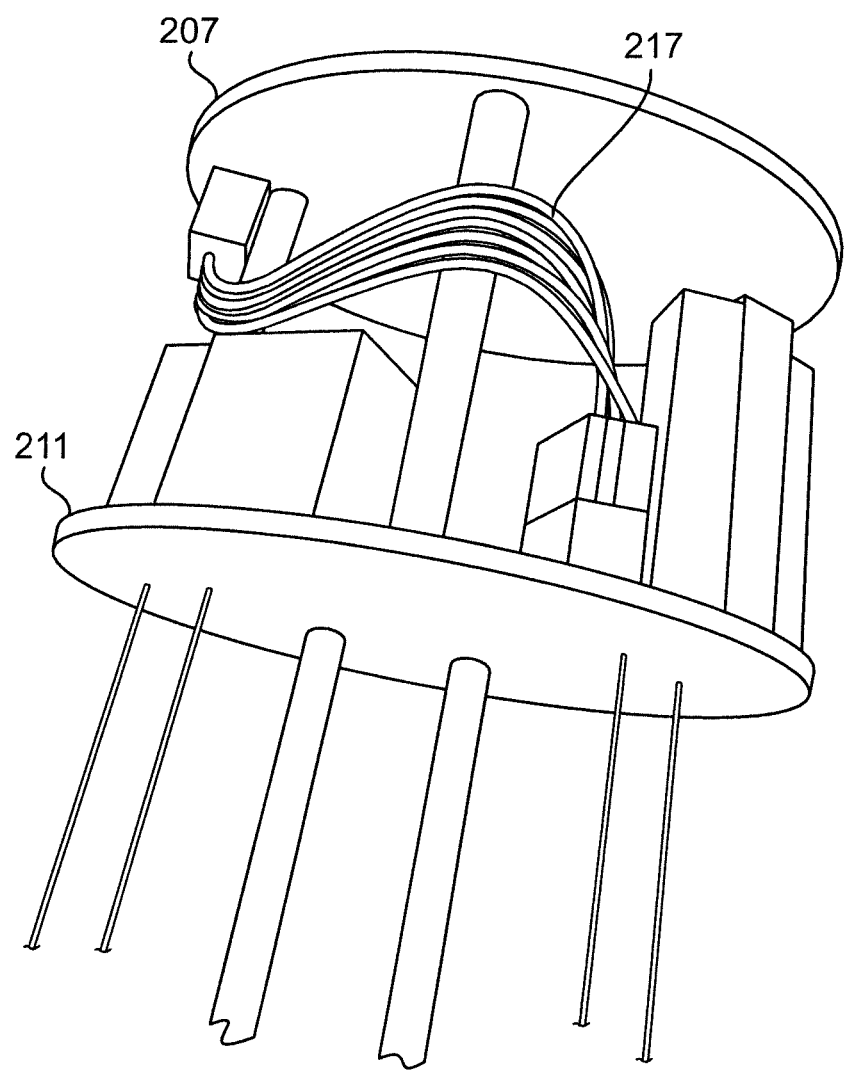
FIG. 11 provides an embodiment of line connections between receptacle pins and a power supply and between a power supply and a control system as described herein.
Figure 12:
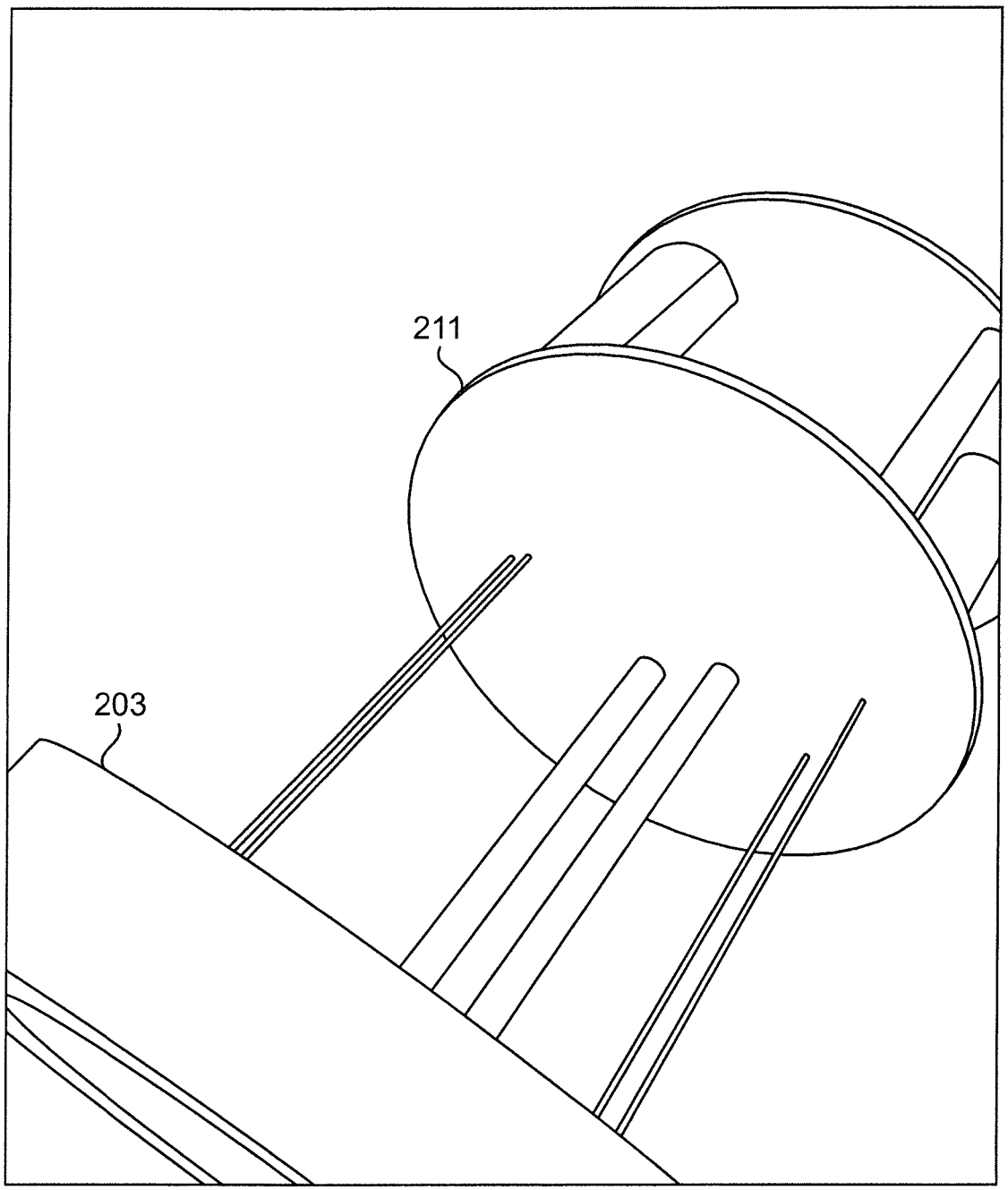
FIG. 12 provides another embodiment of line connection between receptacle pins and a power supply and between a power supply and a control system as described herein.

By way of example and not limitation, this relationship is shown in FIGS. 10, 11, and 12 with respect to the spring contacts (213). Also by way of example and not limitation, a standard may implement a 0-10 volt analog interface to indicate desired light intensity. A 10-volt signal indicates maximum light intensity and 0 volt signal indicates "off" or no light intensity. In the depicted embodiment, the two pairs provide two separate channels of control, referenced to as the "dual channel" aspect.

The depicted contacts (213) are arranged into pairs and each pair connects via the receptacle (115) to a different dimming driver within the luminaire (110) structure. Thus, each pair can be separately commanded or operated to control the luminaire (110) by components, circuitry, and logic in the control system (207).

Figure 8:
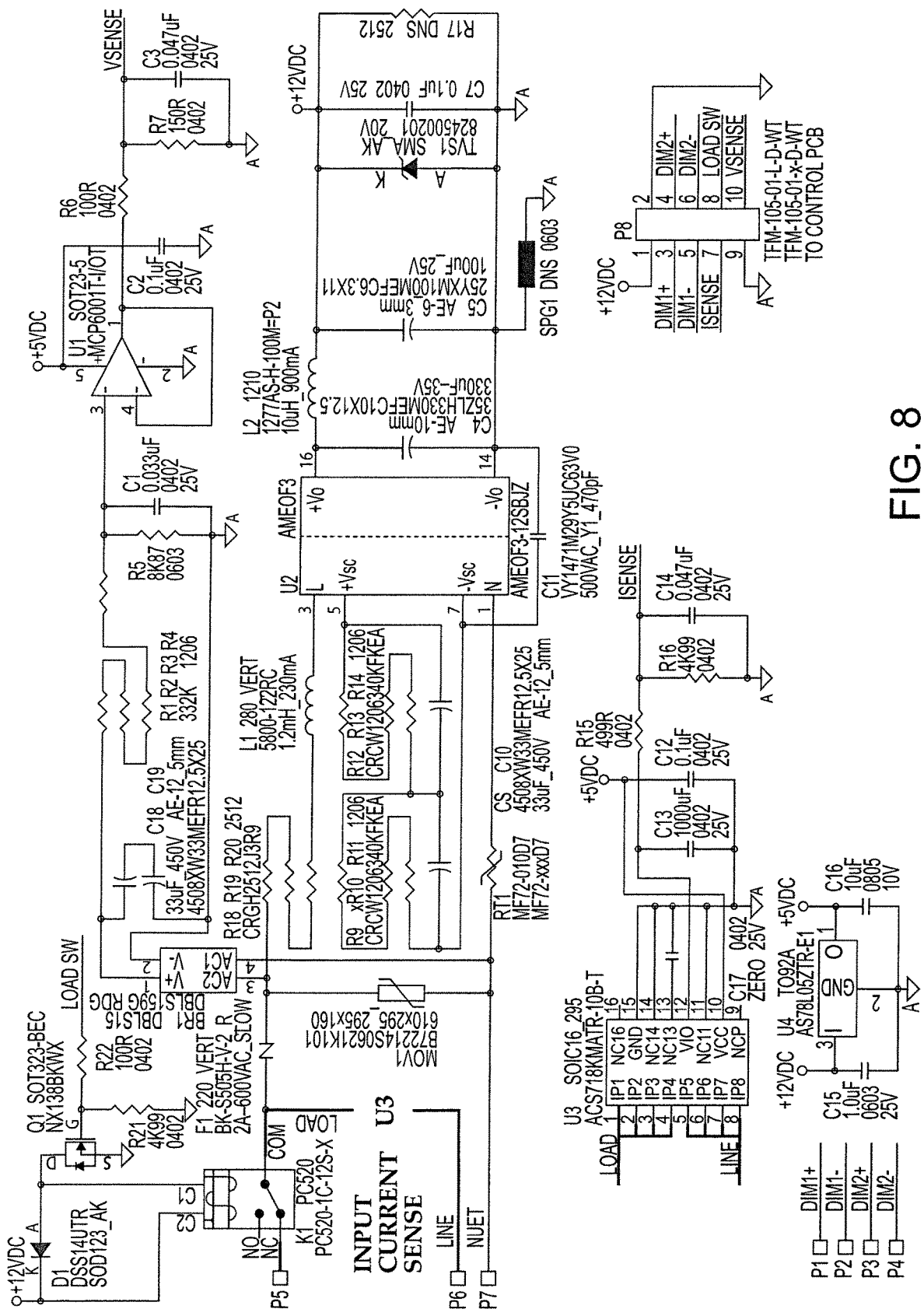
FIG. 8 provides a schematic diagram of a universal power supply for a luminaire control device as described herein.

The power supply (211) is designed and laid out so as to fit within the form factor of the housing (203) and (205), and comprises all components required to adapt the range of power conversion described herein, and leave sufficient surplus volume within the house (203) and (205) to accommodate a control system (207) and/or other components. FIG. 8 provides a schematic diagram of an embodiment of a power supply (211) implementing power conversion from a range of 90-528VAC to 12VDC. For example, header P8 provides the connection to route various electrical lines (e.g., to the control PCB/control system (207)). The current sensing function is at pin 7, P1 (DIM1+) is at pin 3, P2 (DIM1−) is at pin 5, P3 (DIM2+) is at pin 4, P4 (DIM2−) is at pin 6, and a load switch to the relay is at pin 8 of header P8. A device (201) having a form factor compliant with the applicable standards requires small components, yet must also step down voltage as high as 528 VAC to 12 VDC to operate a small electrical load in excess of 1 W, as high as 4 W, and preferably about 3 W to 3.3 W. In particular, the form factor defined by the ANSI standard is generally too small to allow the inclusion of all electronic components required to both convert all ranges of voltage commonly found in a municipal light pole power line, as well as fit a control system (207) and other desired components. Prior art components of appropriate size to be fitted within the device (201) form factor lacked the ability to provide power conversion in this range by a significant margin.

To achieve the required form factor, a transformer core may be custom wound to achieve a desired isolation voltage range within the volume or size limitations imposed by the standard. Additionally, or alternatively, a particular circuit layout may be used to minimize the physical footprint of the power supply (211) so as to fit within the form factor. The depicted embodiment of FIG. 8 has a small enough footprint to be contained within the form factor of the ANSI standard, while also accommodating the control system (207).

The depicted device (201) of FIG. 5 can accept as power input any range of AC current between about 90 and 528 VAC and convert this power input into a consistent level of DC power output. The specific power output may vary from embodiment to embodiment depending upon the power requirements of the associated device to be powered. In the typical embodiment, such as that in which the control system (207) is for controlling a luminaire (110), the power output is about 12 VDC. In a further embodiment, the power output is at least 12 VDC. In a further embodiment, the power output is at least 12 VDC at 140 mA, or about 1.7 W at 12 VDC. In a further embodiment, the average operational capacity is at least 12 VDC at 170 mA, or about 2.0 W at 12 VDC.

In certain embodiments, it may be desirable to have systems and/or apparatus for identifying differing power supply bases. By way of example and not limitation, it may be economical feasible to stock a power supply (211) for converting 90-277 VAC power, and a second power supply (211) for converting up to 480 VAC power. However, it is also desirable that the corresponding control system (207) be agnostic as to which power supply (211) it is packaged with, so that a single software version may be maintained, reducing development and maintenance costs. This may be done by using four pins on the headers connecting the power supply to the control system (207). One such pin would be a ground pin, and three would be signal pins. Depending on the pattern of the three pins connected to the ground line, it is possible to determine which power supply (211) is connected to the control system (207). The other lines not connected to the ground would then be left as floating lines. It should be noted that the ground and signal lines come from the control system (207) and the power supply (211) may only connect the pins together in a specific pattern. Pins D1, D2, and D3 are connected to microcontroller pins. However, in the preferred embodiment, it is desirable to use a uniform configuration of power supply (211) to minimize complexity and stocking requirements, and this element may not be used.

It will be appreciated that the power supply (211) may provide a DC power output at a particular level, but that this level may nevertheless remain too high for some uses. Thus, in some embodiments, a control system (207) may have further "step-down" components disposed thereon to further reduce the power level. For example, the control system (207) components may require power in the range of 3 to 4 VDC at 45-290 mA, or 0.15 to 0.95 W. In an embodiment, the control system (207) may comprise step-down circuitry so as to provide power to associated components in the range of 1.35 W to 4 W. In an embodiment, power is supplied at 3.3 V at 0.410 mA on the control system (207).

Figure 6:
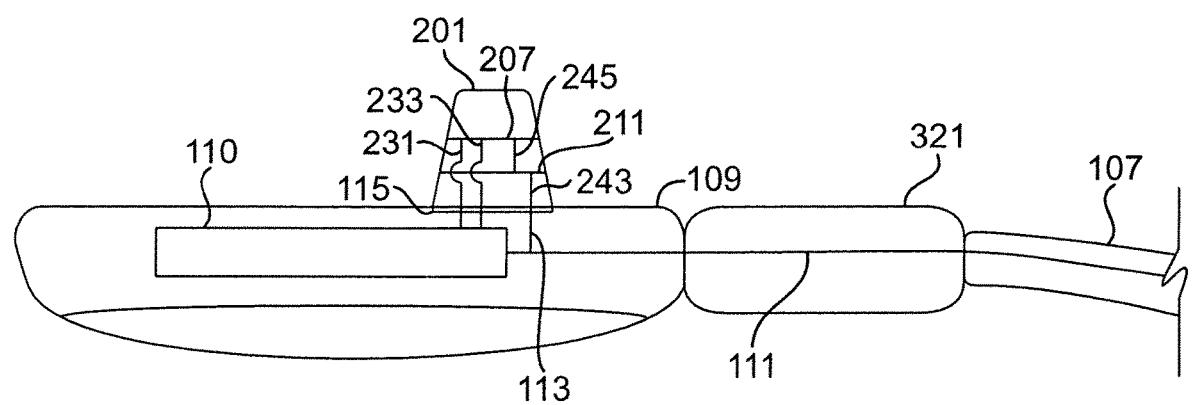
FIG. 6 provides a schematic diagram of an embodiment of a dual-channel luminaire control device as described herein deployed to control a municipal luminaire.

The depicted control system (207) contains components and/or program logic or software to operate the luminaire (110) via one or more control channels, (231) and (233). The depicted embodiment of FIG. 6 is a seven-pin dimming receptacle (115). In an embodiment using a five-pin receptacle, the auxiliary control line (233) would not be present, and a single channel of control line (231) would be used instead. As can be seen in the depicted embodiment of FIG. 6, both control channels (231) and (233) are operatively connected to the luminaire (110) through the dimming receptacle (115).

The control system (207) generally will comprise a circuit board and various components to perform one or more non-power conversion functions. The particular nature of these functions, and, by extension, the associated components, will vary from embodiment to embodiment depending upon the particular needs of any given implementation. Generally, it is anticipated that the control system (207) will usually comprise a processing system (221), such as a computer, microprocessor, microcontroller, controller, or other logic unit, for operating the components of the control system (207) and sending control signals on one or more of the control channels for operation of one or more luminaire(s) (110).

Typically, the control system (207) will further comprise a memory (223) or storage (223) containing executable instructions for operating the device (201) or luminaire(s) (110). The control system (207) may further comprise other appropriate hardware systems and circuitry as necessary to implement the functions described herein. The control system (207) components and program logic/instructions operate the luminaire(s) (110) using control channels (231) and (233) in accordance with the needs of the given embodiment. Other components may also be included in the control system (207) or otherwise disposed within the interior of the assembled device (201) and powered by the power supply (211). These other components may include, but are not necessarily limited to, a microprocessor, a controller, a photocell or other daylight sensing technology, and/or expansion ports for other sensors.

The components of the control system (207) receive power via a wired connection to the power output from the power supply (211). The particular arrangement of such a wired connection will vary from embodiment to embodiment, but typically will be consistent such that only one, or a small number, of power supply (211) configurations need be produced, and any number of different control system (207) or other powered interior components may be used with that one or small number of power supplies (211).

By way of example, and not limitation, one or more of the control channels (231) or (233) could be used to alter the color temperature of the luminaire (110). Alternatively, one channel (231) could be used to control the color temperature of the luminaire (110), while the other channel (233) is used to control the light intensity of the luminaire (110). In this fashion, the luminaire control device (201) has the ability to simultaneously control multiple operational states of the luminaire (110). For example, when there is insufficient light, such as dusk, dawn, overnight, or during inclement weather, power is restored and the luminaire (110) is illuminated.

In an embodiment, the control system (207) may further include a short- or long-range transceiver (225), such as, but not necessarily limited to, a radio transceiver. The transceiver (225) is preferably adapted to receive and transmit using a standard-complaint protocol over short- or long-range distances, such as via a local short-range protocol, a Wi-Fi protocol, or a long-range wireless data protocol, including but not limited to a protocol in the IEEE 802.11 family of protocols. The transceiver (225) may be used to send to or receive from remote devices information, instructions, or requests relating to control of the device (201) and/or the luminaire(s) (110) to which it is connected. Instructions received at the transceiver (225) may then be processed by a processing system (221) and control signals may be sent to the luminaire(s) (110) based on the data received via the transceiver (225).

By way of example and not limitation, the control system (207) may include a mesh radio transmitter, such as that described in U.S. Prov. Pat. App. No. 62/792,213, filed Jan. 14, 2019, and U.S. Pat. No. 10,260,719, issued Apr. 16, 2019, the entire disclosures of which are incorporated herein by reference. In this fashion, the device (201) effectively functions as an IOT device capable of being operated using the systems and methods described in the foregoing references. By including in the control system (207) a wireless transceiver and program logic for receiving, processing, and issuing command instructions to the appropriate channel wires, the luminaire (110) may be remotely operated over a telecommunications network using the device (201). In an embodiment, and as further described in the other applications referenced elsewhere in this disclosure, the control system (207) may include a microprocessor executing program instructions from a memory, which operate communications hardware to exchange data and instructions with other nearby devices (201). Additionally, or alternatively, this may be done to communicate over a WAN (503), including but not limited to a cellular network.

Also by way of example and not limitation, the control system (207) may include other inputs and outputs, including but not limited to ports or connections for other IoT devices to be controlled by the device (201) via wireless communications as described in the above-referenced applications and elsewhere herein. Exemplary embodiments of these and other components contemplated for use with the devices described herein are also described in the above-referenced applications.

Figure 9:
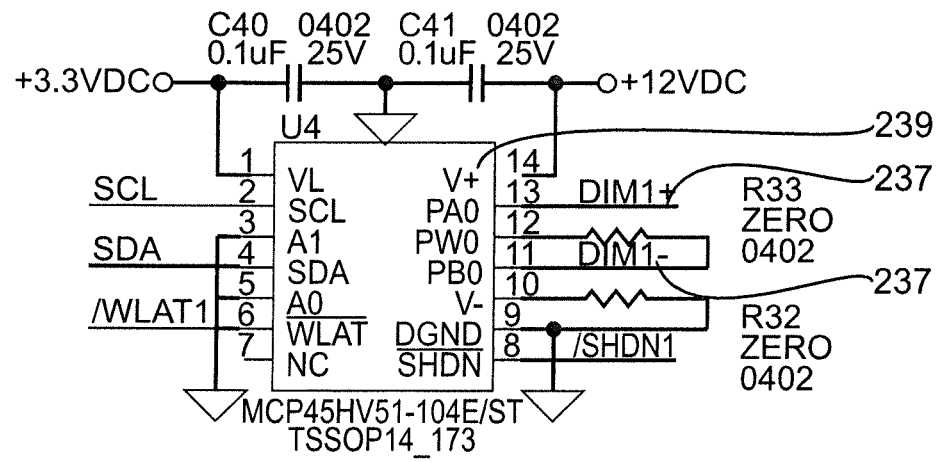
FIG. 9 provides an embodiment of line connections between a microcontroller and a potentiometer to implement a dimming circuit.
Figure 9:
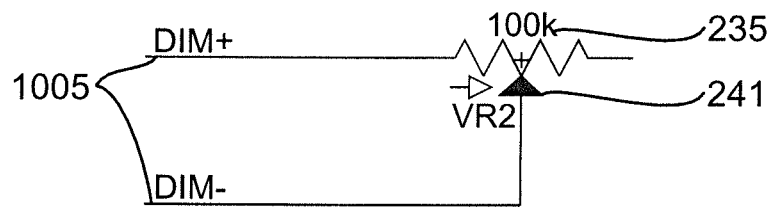

As discussed in the background section, one problem with dimming receptacle standards is that prior art implementations have used pulse-width modulation dimming, which results in flicker when using the dimming circuits. To overcome this, in the embodiment depicted in FIG. 9, a potentiometer (235) may be included in the control system (207) with at least one of the dimming pin sets (237), operated by a microcontroller (239). In the depicted embodiment, the microcontroller (239) is an integrated circuit. As seen in FIG. 9, one set of dimming pins (237) is shown, but the second set (not shown) could also be wired to a potentiometer (235). In the depicted embodiment, the first dimming pin DIM- is connected to the microcontroller (239) at pin PW0 (#11) in FIG. 9. This is the control line for the wiper (241) (e.g., a sliding contact on a resistive strip in the potentiometer that alters the amount of resistance in the circuit). These configurations may be used to create, in effect, a digital "control knob" within the apparatus for controlling luminaire intensity, with reduced flicker and self-correction in the event of pin misalignment.

FIGS. 10, 11, and 12 depict an embodiment of a power supply (211) showing the connecting elements to the control system (207). In an embodiment, a single header is used to connect elements of the power supply (211) to the control system (207). This may be done, for example, by connecting a cable (217) from the control system (207) to the header. In an alternative embodiment, the connecting elements may comprise two rows of headers. That is, the "stack" in the device (201) is ordered, from bottom to top: base (203), then power supply (211) on top of the base (203), and then one or more control systems (207) on top of the power supply (211).

In an embodiment, the number and arrangement of headers may be selected to provide mechanical stability for elements disposed above the power supply (211), including but not necessarily limited to a control system (207). In the depicted embodiments, the rows of headers comprise rows of 0.1" headers, but this is exemplary only and not necessarily limiting. It is specifically contemplated that a single header may suffice in the preferred embodiment.

In an embodiment, at least one of the headers is a conductive signal-carrying element. It is contemplated that at least two pins each of 12 VDC power and a ground line are provided for redundancy to ensure power flow in the event of a mechanical failure of one set of pins. Thus, in the preferred embodiment, at least four pins are devoted to power transmission from the power supply (211) to a control system (207). However, in other embodiments, there may be more (or less) pins having this function.

In an embodiment, at least one header pin provides another function. By way of example and not limitation, a pin may provide signals pertaining to dimming. That is, a controller on the control system (207) may relay signals via the pins to the luminaire to which the device (201) is attached to control dimming functions. Additionally, or alternatively, wires for transmitting dimming controls or instructions may by connected directly to pins on the plug and carried directly to the control system (207). Such wires are not necessarily power supply lines but rather function effectively as a bus, and thus may bypass the power supply (211).

In the depicted embodiments, the components on the control system (207) are in turn powered by the adjusted power output at the appropriate voltages produced on the power supply (211). The device (201) may further include mechanical struts or supports to provide stability and separation between the power supply (211) and the control system (207).

FIG. 6 depicts an embodiment of the municipal luminaire control device (201) installed on a light head (109) containing a luminaire (110). As can be seen in the depicted embodiment of FIG. 6, the luminaire (110) is enclosed within the light head (109), which is attached to a light arm (107). In the depicted embodiment, an enclosure device (321) is installed in-line between the a in (107) and light head (109). The municipal luminaire control device (201) is plugged into a dimming receptacle socket (115) on the dorsal side of the light head (109). A municipal power line (111) is disposed within the arm (107) and passes through the enclosure (321) to power the luminaire (110). This line (111) is connected (113) to the power supply interface in the dimming receptacle (115), as defined by the applicable standard.

When the luminaire control device (201) is attached to the receptacle (115), an electrical connection (243) is formed between the power line (111) and the power supply (211) inside of the device (201). The power supply (211) receives alternating current from municipal power line (111), converts it to direct current and steps down the voltage to an amount useable by the control system (207). The resulting direct current is indicated in FIG. 6 as a wired connection (245). The components of the depicted control system (207) are then powered by the direct current received (245) from the power supply (211).

Figure 7:
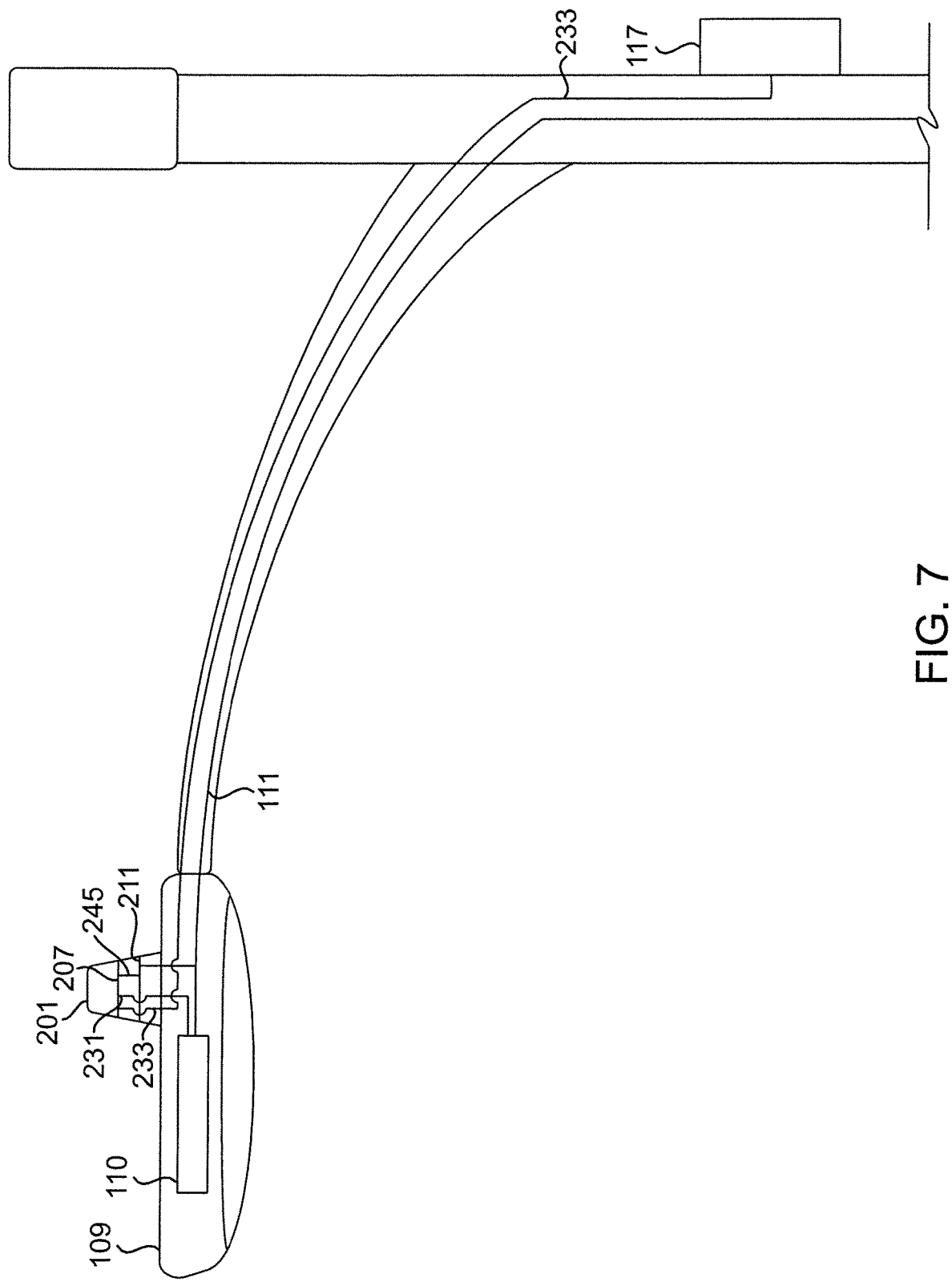
FIG. 7 provides an alternative schematic diagram of an embodiment of a dual-channel luminaire control device as described herein deployed to control two municipal luminaires.

In an alternative embodiment, such as that depicted in FIG. 7, the luminaire control device (201) may be used to control two different luminaires (110) and (117). In the depicted embodiment of FIG. 7, a first luminaire (110) is contained in the light head (109) in a similar fashion as described with respected to FIG. 6, but a second luminaire (117) is disposed elsewhere on the municipal infrastructure pole (103). In this embodiment, the primary channel (231) (e.g., DIM1) may be used by the luminaire control device (201) to operate the primary luminaire (110) in the light head (109), while the auxiliary control channel (233) (e.g., DIM2) may be connected to the second luminaire (117) to control that luminaire (117) instead. In the depicted embodiment, for example, the first luminaire (110) is a traffic luminaire disposed above a street to illuminate the surface below for traffic safety, while the second luminaire (117) is disposed next to the sidewalk to provide illumination and safety to pedestrians adjacent to the street. In this fashion, the luminaire control device (201) can independently operate both luminaires (110) and (117) in accordance with the operational needs of the implementation.

In an embodiment, both the DIM1 and DIM2 commands are used to control a single luminaire (110). By way of example and not limitation, DIM1 may be used to control a first aspect of the luminaire (110) and DIM2 may be used to control a second aspect of the luminaire (110).

In an embodiment, one or more of the luminaires (110) and (117) may be adapted or designed to respond to specific commands issued via the control channels (231) and (233). The specific nature of this design will depend upon the needs of the implementation. By way of example, and not limitation, if the design is intended to provide variance in light intensity, then the luminaires (110) and (117) may be designed to alter light intensity in response to commands or voltages received via the channels (231) and (233). It should be noted that in the depicted embodiment of FIG. 7, the enclosure (321) is omitted for illustrative simplicity.

In an embodiment, a specialized luminaire (110) may be used, which may be specifically adapted to accept and respond to commands issued via the dimming receptacle. That is, although the receptacle is intended for a dimming function (e.g., by use of a photocell to detect sunlight and dim the luminaire (110) when there is sufficient ambient light that use of the luminaire (110) is unnecessary), the standard defines a mechanical and electrical interface which can be used to transmit any number of types of instructions via the control channels (231) and (233). For example, an LED light fixture may be programmed to respond to commands received on DIM1 and/or DIM2 (or just on DIM).

Alternatively, an existing light head (109) may be retrofitted without the necessity of installing a new luminaire (110). For example, the device (201) is installed in a dimming receptacle atop a street light (103) to replace a photo control cell. The device (201) may itself include a photocell and receive a signal from that photocell which is also used to control the luminaire (110), and/or may operate the luminaire (110) in accordance with other criteria depending upon the function of the control system (207).

An improvement over prior art devices is that the ballast drivers may not fully implement "turning off" the luminaire (110). For example, a "1-100" driver is configured to set the light intensity to between 10% of maximum intensity and 100% of maximum intensity. Thus, if a control signal received on P1, P2, P3, or P4 indicates a voltage of zero, meaning a command to cut the light entirely, the ballast driver may nevertheless maintain the luminaire (110) at 10% light intensity. This in turn means that, in a prior art device in which a photovoltaic cell is installed, even with full sun in broad daylight with a 0 volt command signal to the driver, the driver maintains the light on at 10% power, wasting electricity. In one embodiment of the present device, the power supply (211) and control system (207) may implement command logic which cuts line power to the driver entirely, thus ensuring that no power is wasted by a 1-100 driver forcing the luminaire (110) to 10% intensity regardless of the analog control signal.

The luminaire control device (201) described herein may be used to control functions beyond dimmable controls. For example, in an embodiment, the luminaire control device (201) may utilize one or both channels to provide various instructions and functions to the luminaire (110). The particular functions of each channel may vary from embodiment to embodiment while remaining within the requirements of the applicable standard. By way of example and not limitation, the signals transmitted over the control lines may alter the color temperature of the light. In one embodiment, DIM1 may control the 4000 Kelvin temperature range, and DIM2 may control the 6000 Kelvin temperature range. Thus, by increasing DIM1, the color tone of the light becomes more yellow, and by increasing DIM2, the color tone of the light becomes more white. This, in combination with the potentiometer implementation, facilities a smooth gradient of light temperature.

The depicted design has the advantage of being able to receive any amount of municipal voltage commonly distributed in the United States and convert that voltage to a uniform output for use by the control system (207). This allows a single luminaire control device (201) to be manufactured and stocked for any given implementation, and avoids the need for the city to manage a stockpile of multiple devices (201) accepting different voltages, and to monitor and track which poles in a given power grid operate at which voltages. Utility crews may simply pick up a device (201) and install it in any pole, and be confident that the voltage will be accepted, converted, and usable without damaging the device (201). This design also has the advantage of directly utilizing the municipal power supply (111) without the need to include batteries, or photocells, or other solutions which cannot provide a consistent amount of power, resulting in the control system (207) being potentially unpowered and either malfunctioning, or failing to operate the luminaires (110) correctly. Additionally, by utilizing both control channels (231) and (233), multiple aspects of a single luminaire (110) may be controlled by a single device (201), or multiple luminaires (110) may be independently controlled.

Also described herein are systems and methods for providing "localization" of moving objects (e.g., people, vehicles, equipment) by using beacons installed on municipal fixtures (103), such as light and utility poles. The beacons transmit, in the ordinary course of network communication, an identifier. Because the fixtures (103) do not move, the fixed geographic locations of the fixtures (103) can be associated in a database with a unique identifier broadcast by the beacon installed on the fixture (103). When a moving device having a wireless transceiver approaches the fixture (103), it will receive transmissions from the beacon including the identifier, and can then look up the identifier in the database to get the geographic coordinates. This can be done even without the moving device's wireless transceiver authenticating or connected to the beacons' network. This location can then be used for a wide variety of applications and purposes.

Figure 13:
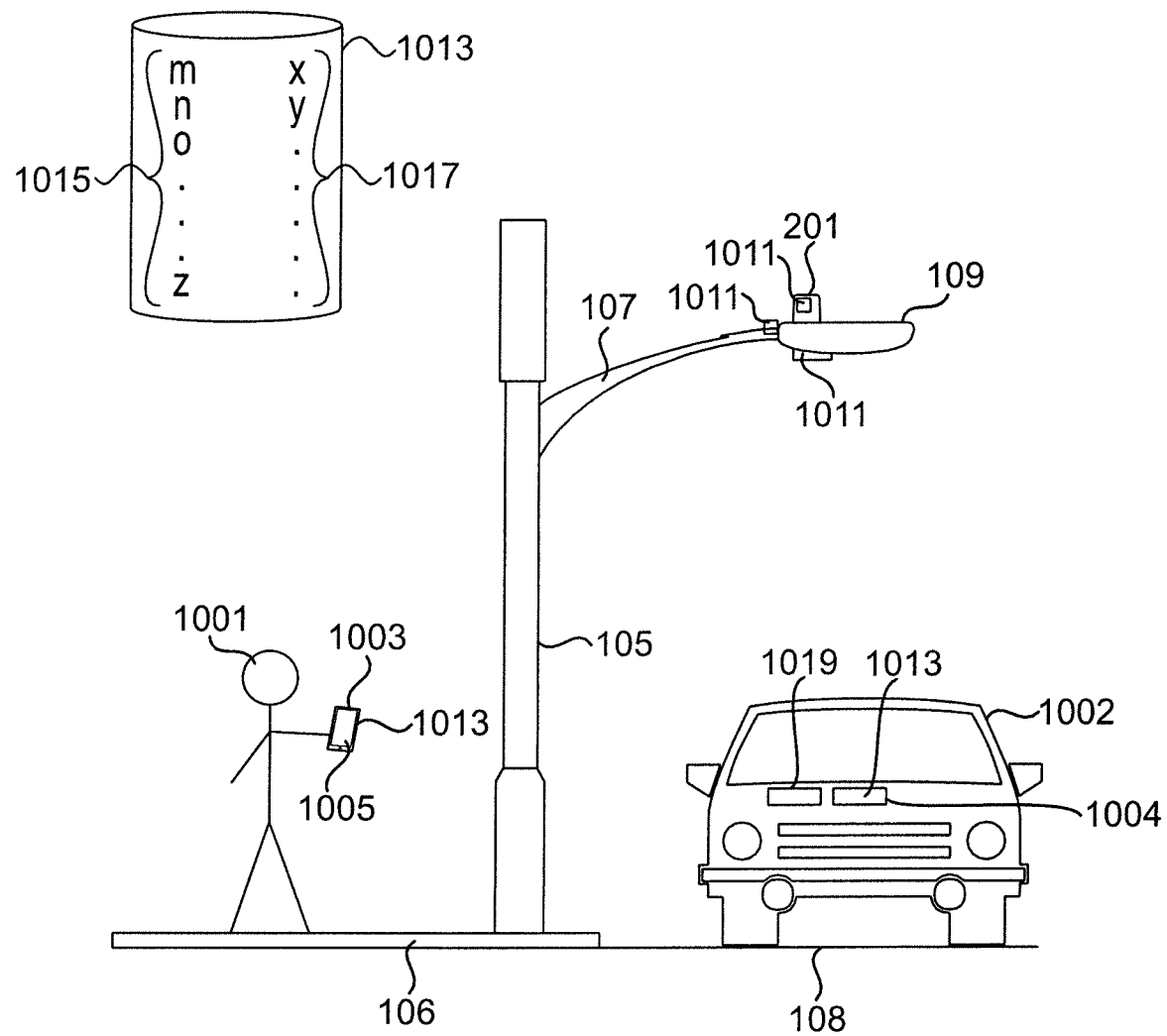
FIG. 13 provides an embodiment of a system and method for determining a geographic location of a movable device as described herein.

As shown in the depicted embodiment of FIG. 13, the luminaire control device (201) may also be used for a number of other purposes, and may incorporate other components to facilitate other functions unrelated to the luminaire control system (207). For example, the control may be designed and/or programmed with circuitry and/or computer logic to a wide variety of functions in addition to those described in this disclosure. As described in other patent applications referenced elsewhere herein, the device (201) may be one of a plurality of devices in a network of similar devices, some or all of which may be equipped or otherwise connected with one or more sensors on or at a utility pole (103). The data detected by the devices (201) may be collected and shared via a wireless network among such devices (201), including but not necessarily limited to a mesh network (505). This data may be used to "localize" where specific incidents or types of incidents have taken place. This data may be provided to municipal authorities, emergency responders, and/or the general public or private parties for use, processing and consumption. The data may be used, for example, in a consumer/end-user software application.

In an embodiment, a short-range radio transceiver (1011), or "beacon," would be installed on some, most, or all of the devices (201) in a given deployment. This may be done by including the beacon (1011) in the control system (207), for example. Such beacons (1011) could be, but are not necessarily limited to, radio transceivers using a wireless communication protocol in the IEEE 802.11 family of protocols, or some other protocol. Examples of suitable protocols include Bluetooth™, WiFi, Ultra-wideband, ISM (Industrial, Scientific, and Medical) bands, and other radio types. In an embodiment, a beacon (1011) may be enclosed within the device (201) or attached in a different location, such as in a photocell or other device using the dorsal receptacle (115), behind the luminaire (110) in an enclosure, or using a Zhaga Book 18 connection.

Such beacons (1011) commonly include a unique, or semi-unique, identifier (1015) which is broadcast with ordinary transmissions as part of the wireless communication protocol. This identifier (1015) helps other devices within broadcast range identify the source of a given wireless signal or data packet. A database (1013) could be assembled which associates, for each unique identifier (1015), a geographic location (1017) where the beacon (1011) having that identifier (1015) is installed (e.g., the geographic coordinates (1017) of the light pole (103) into which a luminaire control device (201) containing the beacon (1011) is plugged). This database (1013) could be stored and accessed locally (e.g., on a mobile device (1003), vehicular telematics system (1004), etc.) or hosted remotely for query/access (e.g., the mobile device (1003) or vehicular telematics system (1004) transmits the beacon identifier (1015) to the remote hosted database (1013), and the database (1013) returns the geographic coordinates (1017) for that beacon identifier (1015)).

To locate a given device (1003) or (1004), the device (1003) or (1004) receives the identifier (1015) for one or more beacons (1011) and looks up (locally or remotely) the associated geographic coordinates (1017). The location of the device (1003) or (1004) can then be approximated to varying degrees of precision. Techniques for doing so include received signal strength indicator analysis, angle of arrival using phased antenna arrays, and other techniques known in the art. The location information calculated can then be used to replace, supplement, or augment other location technologies.

Any number of applications could be programmed or developed to take advantage of this increased accuracy. These include but are not necessarily limited to vehicular navigation and assistant technologies such as lane assist, GPS navigation assistance, routing, autonomous vehicle location and piloting, and traffic flow analysis. Other exemplary applications include managing small or shared commuter vehicle fleets such as bicycles and e-scooter pools, where the location data may be used to geofence the range of the fleet to prevent operation outside of permitted areas. This reduces the need to rely on GPS transmitters, which drain battery life and shorten the operational life of e-scooters.

The technology may be used in smart mobile devices (1003), such as smart watches, smart phones and tablets, virtual and augmented reality headsets, smart earbuds, and other portable and wearable technology. This again allows for location technology without requiring a GPS transceiver. This location data may also be used in activity location tracking technologies, such as exercise applications. This location data may also be used in augmented reality applications and to assist in automated or piloted operation of sidewalk delivery robots, drones and the like.

This localization technology also has application in any situation where GPS alone is not sufficiently accurate, such as cities or areas with low-quality or inconsistent GPS coverage, or applications unsuitable for the operational requirements of a GPS transmitter, such as devices with small form factors and/or limited battery life. This localization technology also has application in any situation where geofencing is desired, such as to prevent operation of devices inside of, or outside of, a geographically defined area.

The locational information may be particularly useful in municipal areas with a large number of tall buildings, which can impede or distort wireless signals and even satellite signals. Additionally, the power drain of long-range transceivers, such as GPS, can be significant, whereas the power drain of a small localized beacon is relatively small. To save battery life, the location system described herein may be used to temporarily replace or supplemental other location services, such as but not necessarily limited to, GPS. This locational system may also be used to provide a secondary or supplemental locational service in situations where limitation in operating system designs inhibit or prevent the use of GPS or other location services.

By way of example and not limitation, the device (201) may comprise circuitry and/or program logic implementing a message/content delivery method suitable for delivering messages or content to nearby pedestrians (1001) or vehicles (1002). In this exemplary embodiment, the mere fact that a mobile device (1003) carried by a pedestrian (1001) or motorist, or a vehicular telematics system (1004) of a vehicle (1002) is able to detect the presence of the beacon (1011) is indicative that the pedestrian (1001) or vehicle (1002) is physically proximate to the beacon (1011).

The location of the pedestrian (1001) or vehicle (1002) can then be determined in real time with precision using any number of techniques. When the mobile device (1003) or telematics system (1004) is close enough to detect wireless signals from the beacon (1011), whether or not mobile device (1003) or telematics system (1004) actually joins the network, the unique identifier (1015) for nearly beacon(s) (1011) can be received and looked up in the database (1013) to find the associated geographical location (1017) for the mobile device (1003) or telematics system (1004). This location can then be used for messaging or content delivery (e.g., via a mobile application (1005) or within the vehicular telematics system (1004)).

The action taken may vary from embodiment and embodiment and will depend on the particular design and business goals of the implementation. For example, the user device (whether a mobile device (1003), telematics system (1004), or some other type of user device) may display for the user (1001) a map of the city highlighting nearby attractions, businesses, or amenities that are open, and/or provide walking or driving directions as the case may be, or may indicate the location of nearby rideshare scooters or other small personal vehicles. In another embodiment, the location may be used to deliver spot marketing, such as coupons or promotions for nearby businesses or events. In a still further embodiment, hazard information may be presented, such as weather alerts, flood warnings, street closures, or reports of emergencies or emergent situations such as recent nearby crime or other dangerous situations with directions to nearby shelter, an alternate path, or other information.

By way of further example, another device (201) in the network may be equipped with a microphone programmed to detect gunshots or a vehicular accidents. If one is detected, the devices (201) may further share that information within the network, including the location of the device (201) which detected the incident. That information may then be shared with the user device (1003) to provide a location for the incident in question and allow the user (1001) to avoid the impacted area or seek shelter.

A number of marketing applications are possible. By way of example, an outdoor advertising screen (e.g., an LED display) could be attached to the light pole, and when a mobile device (1003) is detected as approaching, turned on to display a promotional message, such as ad placement for nearby businesses. Alternatively, if the user (1001) has a mobile device (1003) with software (1005) enabled to receive and display such messages, the mobile device (1003) could detect the nearby beacon (1011) and provide the marketing content via an alert the mobile device (1003), including commercial incentives, such as a coupon or discount code.

The devices and methods described herein may also or alternatively be used in conjunction with vehicular location and traffic management systems. In such an embodiment, a vehicle (1002) is equipped with a wireless transceiver (1019) which communicates with one or more beacons (1011) in a municipal deployment. These communications may then be analyzed for various purposes, including but not necessarily limited to routing, location, driver assistance, and autonomous piloting. This could be done, for example, by including a radio transceiver (1019) in the vehicle and using techniques such as analysis of the signal strength, and/or change in signal strength as the vehicle (1002) moves, to determine the vehicle's (1002) location, heading, speed, and other characteristics. Other technologies may also be used, such as phased array antennas (1019).

The analysis could take place at the vehicle (1002), at the beacon (1011), or at a remote location, but is preferably performed at the vehicle (1002). This is because although the vehicle (1002) could connect to a private network comprised of the plurality of beacons (1011), this is not necessary. As described elsewhere herein, in the ordinary course of operating a wireless network, the beacons (1011) send out frequent status or presence signals, which the transceivers (1019) can detect. The characteristics of these waves can then be analyzed to determine positional and/or locomotive characteristics of the vehicle (1002) without authenticating or connected to a network.

Again, because the beacons (1011) are attached to a light pole (105) with a fixed geographic location (1017) that can be known, the vehicle's computer (1004) can be loaded with a database (1013) of node identifiers (1015) and geographic locations (1017). By comparing the known location (1017) of a given beacon (1011) (e.g., by looking up a unique identifier (1015) associated with the beacon (1011) in a database (1013)), the mere fact that the vehicle (1002) is within range to receive transmissions from a given beacon (1011) can pinpoint a vehicle's (1002) location to a relatively small geographic footprint. Further analysis of signal characteristics can then refine that determination to greater accuracy, and potentially further determine characteristics such as speed and heading. By using multiple beacons (1011), accuracy can be further improved.

By way of example and not limitation, suppose a vehicle is traveling down a municipal street with lights outfitted with the luminaire control systems described herein. The vehicle is positioned next to a first node N1, has just passed a second node N2, and is approaching a third node N3. The signal strength of node N1 will usually be strongest, absent unusual interference, and the signal strength of N2 will be weaker than that of N1 and will grow weaker over time as the vehicle moves further away from the light pole containing N2. Conversely, as the vehicle approaches N3, the signal strength will get stronger. By comparing these various signal strengths, and examining how they change over time, even over relatively small increments, direction, position, and speed can be estimated or inferred.

Although the exemplary embodiments described herein are in the context of a control system for operating a luminaire in a municipal setting, the control system, power supply, and other elements described herein are suitable for use in other applications, in which the control system may implement different or additional functions.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A municipal illumination system comprising:
a municipal utility pole comprising:
    a light arm disposed on a side of said municipal utility pole, said light arm having a municipal light head attached to a distal end thereof comprising:
        a circular receptacle disposed on a dorsal surface of said light head, said circular receptacle having a plurality of pins disposed within its circumstance, said plurality of pins comprising a first pair of pins defining a first channel of electrical communication and a second pair of pins defining a second channel of electrical communication; and
        a first luminaire disposed within said light head and in electrical communication with said dimming receptacle via first channel of electrical communication using said first pair of pins;
    a municipal power line disposed within said municipal utility pole and said light arm, said municipal power line in electrical communication with said dimming receptacle and said first luminaire;
a second luminaire disposed on said municipal utility pole external to said light head and in electrical communication with said dimming receptacle via said second channel of electrical communication using said second pair of pins; and
a luminaire control device having a circular base comprising a plurality of pin contacts and being removably installed in said dimming receptacle such that each pin contact of said plurality of pin contacts is in electrical communication with a corresponding pin in said plurality of pins, said luminaire control device further comprising:
    a housing attached to said base and having an interior volume;
    a power supply disposed within said housing interior volume and in electrical communication with said municipal power line via said dimming receptacle, said power supply receiving alternating current from said municipal power line at a first voltage and comprising electrical components selected and arranged to convert said received alternating current to direct current at a second voltage;
    a control system disposed within said housing and in electrical communication with said first luminaire via said dimming receptacle, said control system comprising a non-transitory computer-readable storage medium and a processing system electrically powered by direct current from said power supply, said non-transitory computer-readable storage medium comprising instructions which, when executed by said processing system, transmit control signals to said first luminaire through said dimming receptacle via said first channel of electrical communication using said first pair of pins; and
    wherein said first voltage is in a range of municipal distribution voltages between about 90 and 528 volts;
    wherein said power supply is a singular power supply device disposed within said housing and capable of converting all possible received alternating current voltages in said municipal distribution voltage range of between about 90 and 528 volts to direct current at said second voltage; and
    wherein said control system instructions, when executed by said processing system, cause control signals to be transmitted to said second luminaire from said control system via said second channel of electrical communication using said second pair of pins.

2. The municipal illumination system of claim 1, further comprising a radio transceiver adapted to wirelessly receive instructions for control of said first luminaire.

3. The municipal illumination system of claim 2, wherein said radio transceiver communicates via a standard in the 802.11 family of wireless protocols.

* * * * *